(12) United States Patent
Burgers et al.

(10) Patent No.: US 12,653,174 B2
(45) Date of Patent: Jun. 16, 2026

(54) DUCT THROTTLED SPRAYER NOZZLE ASSEMBLIES AND METHODS FOR SAME

(71) Applicant: Raven Industries, Inc., Sioux Falls, SD (US)

(72) Inventors: Travis Burgers, Sioux Falls, SD (US); Seth Steensma, Sioux Falls, SD (US); Justin Krosschell, Sioux Falls, SD (US); Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 1152 days.

(21) Appl. No.: 17/357,477

(22) Filed: Jun. 24, 2021

(65) Prior Publication Data

US 2021/0400946 A1     Dec. 30, 2021

Related U.S. Application Data

(60) Provisional application No. 63/043,741, filed on Jun. 24, 2020.

(51) Int. Cl.
*A01M 7/00* (2006.01)
*B05B 1/32* (2006.01)
(Continued)

(52) U.S. Cl.
CPC ........ *A01M 7/0042* (2013.01); *A01M 7/0089* (2013.01); *B05B 1/32* (2013.01); *B05B 12/087* (2013.01); *B05B 13/005* (2013.01)

(58) Field of Classification Search
CPC ..... A01M 7/0042; A01M 7/0089; B05B 1/20; B05B 1/202; B05B 1/30; B05B 1/3026;
(Continued)

(56) References Cited

U.S. PATENT DOCUMENTS

| | | | |
|---|---|---|---|
| 1,582,986 A | 5/1926 | Frank | |
| 1,947,407 A | 2/1934 | Cornell, Jr. | |

(Continued)

FOREIGN PATENT DOCUMENTS

| | | |
|---|---|---|
| AU | 2006202376 B2 | 12/2006 |
| AU | 2009203181 A1 | 2/2010 |

(Continued)

OTHER PUBLICATIONS

"U.S. Appl. No. 18/355,926, Examiner Interview Summary mailed Nov. 26, 2024", 2 pgs.
(Continued)

*Primary Examiner* — Darren W Gorman
(74) *Attorney, Agent, or Firm* — Schwegman Lundberg & Woessner, P.A.

(57) ABSTRACT

A sprayer nozzle assembly includes a control valve configured to control a flow rate of agricultural product according to a duty cycle having valve open and valve closed positions. The assembly includes a sprayer tip having a tip orifice for spraying the agricultural product. A throttled interface duct interconnects the control valve and the sprayer tip. The throttled interface duct includes an interface duct profile. The interface duct profile is configured to decrease a flow characteristic of the agricultural product while the control valve is in the valve closed position.

14 Claims, 12 Drawing Sheets

(51) Int. Cl.
  *B05B 12/08* (2006.01)
  *B05B 13/00* (2006.01)

(58) Field of Classification Search
  CPC   B05B 1/32; B05B 7/12; B05B 12/087; B05B 13/005; B05B 15/658; A01C 23/005; A01C 23/007
  USPC .......................................................... 239/591
  See application file for complete search history.

(56) References Cited

U.S. PATENT DOCUMENTS

| | | | |
|---|---|---|---|
| 3,197,299 A | 7/1965 | Bosse et al. | |
| 3,770,198 A | 11/1973 | Mihara | |
| 3,955,795 A | 5/1976 | Neely | |
| 4,168,033 A * | 9/1979 | von Bernuth | B05B 1/267 |
| | | | 239/523 |
| 4,283,010 A | 8/1981 | Arzi et al. | |
| 4,530,463 A | 7/1985 | Hiniker et al. | |
| 4,582,085 A | 4/1986 | Hafner et al. | |
| 4,632,358 A | 12/1986 | Orth et al. | |
| 4,803,626 A | 2/1989 | Bachman et al. | |
| 4,970,973 A | 11/1990 | Lyle et al. | |
| 5,134,961 A | 8/1992 | Giles et al. | |
| 5,285,814 A | 2/1994 | Pettersson et al. | |
| 5,310,113 A | 5/1994 | Cowgur | |
| 5,333,794 A | 8/1994 | Haruch | |
| 5,337,959 A | 8/1994 | Boyd | |
| 5,475,614 A | 12/1995 | Tofte et al. | |
| 5,479,812 A | 1/1996 | Juntunen et al. | |
| 5,496,100 A | 3/1996 | Schmid | |
| 5,503,366 A | 4/1996 | Zabeck et al. | |
| 5,520,333 A | 5/1996 | Tofte | |
| 5,615,836 A | 4/1997 | Graef | |
| 5,635,911 A | 6/1997 | Landers et al. | |
| 5,649,687 A | 7/1997 | Rosas et al. | |
| 5,653,389 A | 8/1997 | Henderson et al. | |
| 5,703,554 A | 12/1997 | Polgar et al. | |
| 5,704,546 A | 1/1998 | Henderson et al. | |
| 5,772,114 A | 6/1998 | Hunter | |
| 5,801,948 A | 9/1998 | Wood et al. | |
| 5,864,781 A | 1/1999 | White | |
| 5,881,919 A | 3/1999 | Womac et al. | |
| 5,883,383 A | 3/1999 | Dragne | |
| 5,884,205 A | 3/1999 | Elmore et al. | |
| 5,884,224 A | 3/1999 | McNabb et al. | |
| 5,897,600 A | 4/1999 | Elmore et al. | |
| 5,911,362 A | 6/1999 | Wood et al. | |
| 5,913,915 A | 6/1999 | McQuinn | |
| 5,919,242 A | 7/1999 | Greatline et al. | |
| 5,931,882 A | 8/1999 | Fick et al. | |
| 5,936,234 A | 8/1999 | Thomas et al. | |
| 5,938,071 A | 8/1999 | Sauder | |
| 5,941,303 A | 8/1999 | Gowan et al. | |
| 5,967,066 A | 10/1999 | Giles et al. | |
| 5,969,340 A | 10/1999 | Dragne et al. | |
| 5,971,294 A | 10/1999 | Thompson et al. | |
| 5,978,723 A | 11/1999 | Hale et al. | |
| 6,070,538 A | 6/2000 | Flamme et al. | |
| 6,070,539 A | 6/2000 | Flamme et al. | |
| 6,079,340 A | 6/2000 | Flamme et al. | |
| 6,086,042 A | 7/2000 | Scott et al. | |
| 6,089,743 A | 7/2000 | Mcquinn et al. | |
| 6,093,926 A | 7/2000 | Mertins et al. | |
| 6,112,999 A | 9/2000 | Fingleton et al. | |
| 6,122,581 A | 9/2000 | McQuinn | |
| 6,149,071 A | 11/2000 | Maccallummhor et al. | |
| 6,189,466 B1 | 2/2001 | Sinclair et al. | |
| 6,189,807 B1 | 2/2001 | Miller et al. | |
| 6,196,473 B1 | 3/2001 | Beeren et al. | |
| 6,199,000 B1 | 3/2001 | Keller et al. | |
| 6,209,563 B1 | 4/2001 | Seid et al. | |
| 6,216,614 B1 | 4/2001 | Wollenhaupt | |
| 6,230,091 B1 | 5/2001 | McQuinn et al. | |
| 6,236,924 B1 | 5/2001 | Motz et al. | |

| | | | |
|---|---|---|---|
| 6,269,757 B1 | 8/2001 | Kiest | |
| 6,305,583 B1 | 10/2001 | Ward et al. | |
| 6,373,057 B1 | 4/2002 | Penfold | |
| 6,486,761 B1 | 11/2002 | Czarnetzki et al. | |
| 6,522,948 B1 | 2/2003 | Benneweis | |
| 6,598,944 B1 | 7/2003 | Wolff et al. | |
| 6,606,542 B2 | 8/2003 | Hauwiller et al. | |
| 6,661,514 B1 | 12/2003 | Tevs et al. | |
| 6,666,384 B2 | 12/2003 | Prandi | |
| 6,678,580 B2 | 1/2004 | Benneweis | |
| 6,698,368 B2 | 3/2004 | Cresswell | |
| 6,708,080 B2 | 3/2004 | Benneweis | |
| 6,720,684 B2 | 4/2004 | Czimmek | |
| 6,755,390 B2 | 6/2004 | Masuda et al. | |
| 6,776,355 B2 | 8/2004 | Ringer et al. | |
| 6,853,276 B2 | 2/2005 | Smith | |
| 6,877,675 B2 | 4/2005 | Benneweis | |
| 6,877,717 B2 | 4/2005 | Collins et al. | |
| 6,959,907 B2 | 11/2005 | Hironaka | |
| 6,994,406 B1 | 2/2006 | Krawczyk et al. | |
| 7,124,964 B2 | 10/2006 | Bui | |
| 7,152,540 B1 | 12/2006 | Sauder et al. | |
| 7,195,027 B2 | 3/2007 | Goossens et al. | |
| 7,243,899 B2 | 7/2007 | Acar et al. | |
| 7,347,221 B2 | 3/2008 | Berger et al. | |
| 7,395,769 B2 | 7/2008 | Jensen | |
| 7,441,746 B2 | 10/2008 | Sugiyama | |
| 7,472,660 B2 | 1/2009 | Mariman et al. | |
| 7,478,603 B2 | 1/2009 | Riewerts et al. | |
| 7,490,564 B2 | 2/2009 | Allan et al. | |
| 7,626,288 B2 | 12/2009 | Protze | |
| 7,690,440 B2 | 4/2010 | Dean et al. | |
| 7,694,638 B1 | 4/2010 | Riewerts et al. | |
| 7,706,926 B2 | 4/2010 | Peterson | |
| 7,848,865 B2 | 12/2010 | Di Federico et al. | |
| 8,078,367 B2 | 12/2011 | Sauder et al. | |
| 8,109,448 B2 | 2/2012 | Giles | |
| 8,141,504 B2 | 3/2012 | Dean et al. | |
| 8,170,825 B2 | 5/2012 | Beaujot et al. | |
| 8,186,288 B2 | 5/2012 | Chinkiwsky | |
| 8,191,795 B2 | 6/2012 | Grimm et al. | |
| 8,191,798 B2 | 6/2012 | Hahn et al. | |
| 8,246,004 B2 | 8/2012 | Kratzer | |
| 8,488,874 B2 | 7/2013 | Zaman et al. | |
| 8,523,085 B2 | 9/2013 | Grimm et al. | |
| 8,590,859 B2 | 11/2013 | Kurz | |
| 8,634,993 B2 | 1/2014 | McClure | |
| 8,635,963 B2 | 1/2014 | Friggstad | |
| 8,701,707 B2 | 4/2014 | Moosmann et al. | |
| 8,844,838 B2 | 9/2014 | Funseth et al. | |
| 8,919,676 B2 | 12/2014 | Funseth et al. | |
| 9,052,031 B2 | 6/2015 | Leidig | |
| 9,073,070 B2 | 7/2015 | Funseth et al. | |
| 9,080,684 B2 | 7/2015 | Stahr | |
| 9,266,124 B2 | 2/2016 | Humpal | |
| 9,453,585 B2 | 9/2016 | Sato et al. | |
| 9,470,332 B2 | 10/2016 | Miura | |
| 9,504,212 B2 | 11/2016 | Michael et al. | |
| 9,506,578 B2 | 11/2016 | Lee | |
| 9,702,475 B2 | 7/2017 | Scheffel et al. | |
| 9,781,916 B2 | 10/2017 | Preheim et al. | |
| 10,058,879 B2 | 8/2018 | Needham | |
| 10,173,236 B2 | 1/2019 | Preheim et al. | |
| 10,189,031 B2 | 1/2019 | Funseth et al. | |
| 10,368,538 B2 | 8/2019 | Preheim et al. | |
| 10,518,284 B2 | 12/2019 | Thurow et al. | |
| 11,051,505 B2 | 7/2021 | Humpal et al. | |
| 11,744,239 B2 | 9/2023 | Kocer et al. | |
| 2002/0005443 A1 * | 1/2002 | Drechsel | B05B 1/30 |
| | | | 239/722 |
| 2002/0030119 A1 | 3/2002 | Proharam | |
| 2002/0107609 A1 | 8/2002 | Benneweis | |
| 2003/0070597 A1 | 4/2003 | Cresswell | |
| 2003/0234301 A1 | 12/2003 | Swan | |
| 2004/0036048 A1 | 2/2004 | Petersen | |
| 2004/0104370 A1 | 6/2004 | Suzuki | |
| 2004/0128045 A1 | 7/2004 | Benneweis | |
| 2005/0048196 A1 | 3/2005 | Yanagita et al. | |
| 2005/0051749 A1 | 3/2005 | Lee | |

(56) References Cited

U.S. PATENT DOCUMENTS

| | | |
|---|---|---|
| 2005/0092951 A1 | 5/2005 | Groetzinger |
| 2005/0125083 A1 | 6/2005 | Kiko |
| 2005/0173979 A1 | 8/2005 | Voss |
| 2006/0097210 A1 | 5/2006 | Fong et al. |
| 2006/0237562 A1 | 10/2006 | Hedegard |
| 2006/0265106 A1 | 11/2006 | Giles et al. |
| 2006/0273189 A1 | 12/2006 | Grimm et al. |
| 2007/0128372 A1 | 6/2007 | Wirth et al. |
| 2008/0114497 A1 | 5/2008 | Giles et al. |
| 2008/0283633 A1 | 11/2008 | Nozaki et al. |
| 2008/0296398 A1 | 12/2008 | Hickman et al. |
| 2009/0112372 A1 | 4/2009 | Peterson |
| 2009/0134237 A1 | 5/2009 | Giles |
| 2009/0184182 A1 | 7/2009 | Beeren |
| 2010/0032492 A1 | 2/2010 | Grimm et al. |
| 2010/0101469 A1 | 4/2010 | Landphair et al. |
| 2010/0163774 A1 | 7/2010 | Rimboym et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2012/0045013 A1 | 2/2012 | Chen et al. |
| 2012/0080624 A1 | 4/2012 | Stahr et al. |
| 2012/0153051 A1 | 6/2012 | Kah, Jr. et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0241533 A1 | 9/2012 | Moeller et al. |
| 2012/0271467 A1 | 10/2012 | Grimm et al. |
| 2013/0032737 A1 | 2/2013 | Neilson et al. |
| 2013/0037633 A1 | 2/2013 | Walter et al. |
| 2013/0043321 A1 | 2/2013 | Thomas et al. |
| 2013/0092746 A1 | 4/2013 | Scott et al. |
| 2013/0292590 A1 | 11/2013 | Stahr |
| 2013/0306894 A1 | 11/2013 | Weis et al. |
| 2013/0320106 A1 | 12/2013 | Schmidt |
| 2013/0333601 A1 | 12/2013 | Shivak |
| 2014/0014863 A1 | 1/2014 | Najmolhoda et al. |
| 2014/0026995 A1 | 1/2014 | Mayr et al. |
| 2014/0084196 A1 | 3/2014 | Heyer et al. |
| 2014/0091243 A1 | 4/2014 | Leidig |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0333398 A1 | 11/2014 | Nila et al. |
| 2014/0361094 A1 | 12/2014 | Michael |
| 2015/0336116 A1 | 11/2015 | Gerdes |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0017792 A1 | 1/2016 | Fletcher et al. |
| 2016/0044862 A1 | 2/2016 | Kocer et al. |
| 2016/0084382 A1 | 3/2016 | Pisasale |
| 2016/0136671 A1 | 5/2016 | Kocer |
| 2016/0175869 A1 | 6/2016 | Sullivan et al. |
| 2016/0178422 A1 | 6/2016 | Humpal et al. |
| 2016/0227755 A1 | 8/2016 | Preheim et al. |
| 2016/0251008 A1 | 9/2016 | Jeon et al. |
| 2017/0018345 A1 | 1/2017 | Raff et al. |
| 2017/0079200 A1 | 3/2017 | Posselius et al. |
| 2017/0120263 A1 | 5/2017 | Needham |
| 2017/0284285 A1 | 10/2017 | Lenk et al. |
| 2017/0314580 A1 | 11/2017 | Steensma et al. |
| 2017/0348718 A1 | 12/2017 | Preheim et al. |
| 2018/0042214 A1 | 2/2018 | Preheim et al. |
| 2018/0126397 A1 | 5/2018 | Le Cardinal et al. |
| 2019/0029170 A1 | 1/2019 | Wilger |
| 2019/0350187 A1 | 11/2019 | Kocer et al. |
| 2021/0102637 A1 | 4/2021 | Krosschell et al. |
| 2021/0176977 A1 | 6/2021 | Bremer et al. |
| 2023/0141050 A1 | 5/2023 | Sibley et al. |
| 2024/0130347 A1 | 4/2024 | Kocer et al. |

FOREIGN PATENT DOCUMENTS

| | | |
|---|---|---|
| AU | 2012201357 A1 | 9/2012 |
| AU | 2013203361 A1 | 10/2013 |
| AU | 2013204455 A1 | 3/2014 |
| AU | 2019229358 | 4/2020 |
| AU | 2021297320 B2 | 3/2024 |
| BR | 112022026505 | 5/2023 |
| CA | 2549300 A1 | 12/2006 |
| CA | 2674527 A1 | 2/2010 |
| CA | 2770013 A1 | 9/2012 |
| CA | 2811726 A1 | 10/2013 |
| CA | 2813949 A1 | 2/2014 |
| CA | 2926448 C | 9/2020 |
| CA | 3049421 | 3/2023 |
| CN | 202255911 U | 5/2012 |
| CN | 102266829 B | 12/2012 |
| CN | 203264929 U | 11/2013 |
| EP | 0963255 B1 | 10/2002 |
| EP | 0847307 B2 | 1/2003 |
| EP | 3565398 B1 | 6/2024 |
| GB | 2322573 A | 9/1998 |
| JP | 2000139245 A | 5/2000 |
| JP | 2005161221 A | 6/2005 |
| WO | WO-9712688 A1 | 4/1997 |
| WO | WO-2008059984 A1 | 5/2008 |
| WO | WO-2013135430 A1 | 9/2013 |
| WO | WO-2014201008 A1 | 12/2014 |
| WO | WO-2014210043 A1 | 12/2014 |
| WO | WO-2015058091 A1 | 4/2015 |
| WO | WO-2017124175 A1 | 7/2017 |
| WO | WO-2017192625 A1 | 11/2017 |
| WO | WO-2017223252 A1 | 12/2017 |
| WO | WO-2018129323 A1 | 7/2018 |
| WO | WO-2018129376 A2 | 7/2018 |
| WO | WO-2018129376 A3 | 7/2018 |
| WO | WO-2021066962 A1 | 4/2021 |
| WO | WO-2021263024 A1 | 12/2021 |

OTHER PUBLICATIONS

"U.S. Appl. No. 18/355,926, Restriction Requirement mailed Aug. 30, 2024", 10 pgs.

"Canadian Application Serial No. 3,182,267, Response filed Jul. 31, 2024 to Examiners Rule 86(2) Report mailed Apr. 2, 2024", 21 pgs.

"Canadian Application Serial No. 3,185,961, Response filed Aug. 12, 2024 to Examiners Rule 86(2) Report mailed May 6, 2024", 8 pgs.

"European Application Serial No. 24174311.1, Extended European Search Report mailed Jul. 10, 2024", 5 pgs.

"U.S. Appl. No. 16/476,069, Notice of Allowance mailed Apr. 20, 2023", 8 pgs.

"European Application Serial No. 21827830.7, Voluntary Amendment filed Aug. 9, 2023", 6 pgs.

"U.S. Appl. No. 13/832,678, Advisory Action mailed Jun. 3, 2016", 3 pgs.

"U.S. Appl. No. 13/832,678, Final Office Action mailed Mar. 17, 2016", 12 pgs.

"U.S. Appl. No. 13/832,678, Non Final Office Action mailed Oct. 1, 2015", 15 pgs.

"U.S. Appl. No. 13/832,678, Notice of Allowance mailed Jul. 20, 2016", 13 pgs.

"U.S. Appl. No. 13/832,678, Response filed May 12, 2016 to Final Office Action mailed Mar. 17, 2016", 10 pgs.

"U.S. Appl. No. 13/832,678, Response filed Jul. 27, 2015 to Restriction Requirement mailed Jun. 9, 2015", 7 pgs.

"U.S. Appl. No. 13/832,678, Response filed Dec. 31, 2015 to Non Final Office Action mailed Oct. 1, 2015", 10 pgs.

(56)          References Cited

OTHER PUBLICATIONS

"U.S. Appl. No. 13/832,678, Restriction Requirement mailed Jun. 9, 2015", 7 pgs.

"U.S. Appl. No. 13/832,735, Final Office Action mailed Aug. 5, 2016", 29 pgs.

"U.S. Appl. No. 13/832,735, Non Final Office Action mailed Feb. 19, 2016", 26 pgs.

"U.S. Appl. No. 13/832,735, Non Final Office Action mailed Jul. 15, 2015", 22 pgs.

"U.S. Appl. No. 13/832,735, Response filed May 19, 2016 to Non Final Office Action mailed Feb. 19, 2016", 13 pgs.

"U.S. Appl. No. 13/832,735, Response filed Nov. 16, 2015 to Non-Final Office Action mailed Jul. 15, 2015", 16 pgs.

"U.S. Appl. No. 14/300,761, Advisory Action mailed Dec. 12, 2017", 3 pgs.

"U.S. Appl. No. 14/300,761, Examiner Interview Summary mailed Nov. 22, 2017", 3 pgs.

"U.S. Appl. No. 14/300,761, Final Office Action mailed Aug. 31, 2017", 11 pgs.

"U.S. Appl. No. 14/300,761, Final Office Action mailed Nov. 27, 2018", 16 pgs.

"U.S. Appl. No. 14/300,761, Final Office Action mailed Dec. 18, 2020", 14 pgs.

"U.S. Appl. No. 14/300,761, Non Final Office Action mailed Feb. 8, 2017", 13 pgs.

"U.S. Appl. No. 14/300,761, Non Final Office Action mailed Apr. 15, 2020", 17 pgs.

"U.S. Appl. No. 14/300,761, Non Final Office Action mailed May 24, 2018", 16 pgs.

"U.S. Appl. No. 14/300,761, Notice of Allowance mailed May 7, 2021", 16 pgs.

"U.S. Appl. No. 14/300,761, Response filed Apr. 19, 2021 to Final Office Action mailed Dec. 18, 2020", 19 pgs.

"U.S. Appl. No. 14/300,761, Response filed Jun. 7, 2017 to Non Final Office Action mailed Feb. 8, 2017", 16 pgs.

"U.S. Appl. No. 14/300,761, Response filed Oct. 15, 2020 to Non Final Office Action mailed Apr. 15, 2020", 17 pgs.

"U.S. Appl. No. 14/300,761, Response filed Oct. 24, 2018 to Non Final Office Action mailed May 24, 2018", 22 pgs.

"U.S. Appl. No. 14/300,761, Response filed Nov. 29, 2019 to Final Office Action mailed Nov. 27, 2018", 21 pgs.

"U.S. Appl. No. 14/300,761, Response filed Dec. 20, 2016 to Restriction Requirement mailed Oct. 20, 2016", 15 pgs.

"U.S. Appl. No. 14/300,761, Resposne filed Nov. 16, 2017 to Final Office Action mailed Aug. 31, 2017", 16 pgs.

"U.S. Appl. No. 14/300,761, Restriction Requirement mailed Oct. 20, 2016", (9 pgs).

"U.S. Appl. No. 14/899,946, Final Office Action mailed Dec. 28, 2018", 41 pgs.

"U.S. Appl. No. 14/899,946, Non Final Office Action mailed Mar. 26, 2018", 37 pgs.

"U.S. Appl. No. 14/899,946, Response filed Aug. 27, 2018 to Non Final Office Action mailed Mar. 26, 2018", 27 pgs.

"U.S. Appl. No. 15/029,935, Final Office Action mailed Jul. 11, 2017", 6 pgs.

"U.S. Appl. No. 15/029,935, Non Final Office Action mailed Mar. 30, 2017", 21 pgs.

"U.S. Appl. No. 15/029,935, Notice of Allowance mailed Aug. 29, 2017", 5 pgs.

"U.S. Appl. No. 15/029,935, Preliminary Amendment filed Apr. 15, 2016", 3 pgs.

"U.S. Appl. No. 15/029,935, Reponse filed Aug. 16, 2017 to Final Office Action mailed Jul. 11, 2017", 11 pgs.

"U.S. Appl. No. 15/029,935, Response filed Jun. 15, 2017 to Non Final Office Action mailed Mar. 30, 2017", 12 pgs.

"U.S. Appl. No. 15/585,034, Non Final Office Action mailed Nov. 2, 2018", 25 pgs.

"U.S. Appl. No. 15/629,696, Corrected Notice of Allowability mailed Aug. 29, 2018", 4 pgs.

"U.S. Appl. No. 15/629,696, Corrected Notice of Allowability mailed Dec. 7, 2018", 2 pgs.

"U.S. Appl. No. 15/629,696, Ex Parte Quayle Action mailed May 3, 2018", 12 pgs.

"U.S. Appl. No. 15/629,696, Response filed Jul. 3, 2018 to Ex Parte Quayle Action mailed May 3, 2018", 13 pgs.

"U.S. Appl. No. 15/629,696, Response filed Nov. 13, 2018 to Examiner's Reasons for Allowance mailed May 3, 2018", 2 pgs.

"U.S. Appl. No. 15/703,818, Corrected Notice of Allowability mailed Jul. 8, 2019", 2 pgs.

"U.S. Appl. No. 15/703,818, Non Final Office Action mailed Oct. 11, 2018", 6 pgs.

"U.S. Appl. No. 15/703,818, Notice of Allowance mailed Mar. 20, 2019", 5 pgs.

"U.S. Appl. No. 15/703,818, Preliminary Amendment filed Nov. 3, 2017", 6 pgs.

"U.S. Appl. No. 15/703,8181, Response filed Jan. 11, 2019 to Non Final Office Action mailed Oct. 11, 2018", 9 pgs.

"U.S. Appl. No. 16/447,779, Corrected Notice of Allowability mailed May 26, 2021", 2 pgs.

"U.S. Appl. No. 16/447,779, Non Final Office Action mailed Jan. 12, 2021", 9 pgs.

"U.S. Appl. No. 16/447,779, Notice of Allowance mailed May 20, 2021", 5 pgs.

"U.S. Appl. No. 16/447,779, Preliminary Amendment filed Dec. 30, 2019", 4 pgs.

"U.S. Appl. No. 16/447,779, Response filed Apr. 12, 2021 to Non Final Office Action mailed Jan. 12, 2021", 7 pgs.

"U.S. Appl. No. 16/476,069, Corrected Notice of Allowability mailed Jan. 30, 2023", 2 pgs.

"U.S. Appl. No. 16/476,069, Examiner Interview Summary mailed Mar. 18, 2022", 2 pgs.

"U.S. Appl. No. 16/476,069, Examiner Interview Summary mailed U.S. Appl. No. 16/476,069, Examiner Interview Summary mailed Oct. 28, 2022", 2 pgs.

"U.S. Appl. No. 16/476,069, Final Office Action mailed Jul. 25, 2022", 13 pgs.

"U.S. Appl. No. 16/476,069, Non Final Office Action mailed Nov. 12, 2021", 13 pgs.

"U.S. Appl. No. 16/476,069, Notice of Allowance mailed Jan. 19, 2023", 8 pgs.

"U.S. Appl. No. 16/476,069, Preliminary Amendment filed Jul. 3, 2019", 13 pgs.

"U.S. Appl. No. 16/476,069, Response filed Apr. 11, 2022 to Non Final Office Action mailed Nov. 12, 2021", 12 pgs.

"U.S. Appl. No. 16/476,069, Response filed Jul. 27, 2021 to Restriction Requirement mailed May 3, 2021", 10 pgs.

"U.S. Appl. No. 16/476,069, Response filed Oct. 25, 2022 to Final Office Action mailed Jul. 25, 2022", 13 pgs.

"U.S. Appl. No. 16/476,069, Restriction Requirement mailed May 3, 2021", 9 pgs.

"Application Serial No. PCT/US2014/061150, International Preliminary Report on Patentability mailed Oct. 16, 2015", 10 pgs.

"U.S. Appl. No. 15/629,696, Notice of Allowance mailed Aug. 13, 2018", 5 pgs.

"Australian Application Serial No. 2014278310, First Examiners Report mailed on Jul. 28, 2017", 5 pgs.

"Australian Application Serial No. 2017285727, First Examination Report mailed May 21, 2019", 2 pgs.

"Brazilian Application Serial No. 1120160085175, Office Action mailed Mar. 25, 2020", (w/ English Translation), 6 pgs.

"Brazilian Application Serial No. 1120160085175, Office Action mailed Nov. 6, 2018", (w/ English Translation), 6 pgs.

"Brazilian Application Serial No. 1120160085175, Response filed Jul. 27, 2020 to Office Action mailed Mar. 25, 2020", (w/ English Translation of Claims), 102 pgs.

"Canadian Application Serial No. 2,926,448, Examiner's Rule 30(2) Requisition mailed Jul. 23, 2019", 3 pgs.

"Canadian Application Serial No. 2,926,448, Examiner's Rule 30(2) Requisition mailed Oct. 3, 2018", 3 pgs.

"Canadian Application Serial No. 2,926,448, Office Action mailed Jan. 5, 2018", 5 pgs.

(56) References Cited

OTHER PUBLICATIONS

"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.
"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"European Application Serial No. 18735853.6, Communication Pursuant to Article 94(3) EPC mailed Jun. 10, 2022", 3 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communiciation pursuant to Rules 161(2) and 162 EPC mailed Aug. 13, 2019", 16 pgs.
"European Application Serial No. 18735853.6, Response filed Oct. 18, 2022 to Communication Pursuant to Article 94(3) EPC mailed Jun. 10, 2022", 24 pgs.
"European Application Serial No. 18735853.6, Response filed Oct. 28, 2021 to Communication Pursuant to Article 94(3) EPC mailed Jun. 18, 2021", 17 pgs.
"German Application Serial No. 11 2017 003 084.6, Office Action mailed Feb. 5, 2019", (w/ English Translation), 5 pgs,.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 2015 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2014/043926, International Preliminary Report on Patentability Jan. 7, 2016", 11 pgs.
"International Application Serial No. PCT/US2014/043926, International Search Report mailed Nov. 3, 2014", 2 pgs.
"International Application Serial No. PCT/US2014/043926, Written Opinion mailed Nov. 3, 2014", 9 pgs.
"International Application Serial No. PCT/US2014/061150, International Search Report mailed Feb. 4, 2015", 2 pgs.
"International Application Serial No. PCT/US2014/061150, Written Opinion mailed Feb. 4, 2015", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017", 8 pgs.

"International Application Serial No. PCT/US2017/038622, International Preliminary Report on Patentability mailed Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion mailed Sep. 28, 2017", 5 pgs.
"International Application Serial No. PCT/US2018/012590, International Search Report mailed Apr. 13, 2018", 4 pgs.
"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Preliminary Report on Patentability mailed Jul. 18, 2019", 11 pgs.
"International Application Serial No. PCT/US2018/012661, International Search Report mailed Jun. 21, 2018", 4 pgs.
"International Application Serial No. PCT/US2018/012661, Invitation to Pay Additional Fees and Partial Search Report mailed Mar. 15, 2018", 2 pgs.
"International Application Serial No. PCT/US2018/012661, Written Opinion mailed Jun. 21, 2018", 9 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
"International Application Serial No. PCT/US2021/038955, International Preliminary Report on Patentability mailed Jan. 5, 2023", 7 pgs.
"International Application Serial No. PCT/US2021/038955, International Search Report mailed Sep. 29, 2021", 2 pgs.
"International Application Serial No. PCT/US2021/038955, Written Opinion mailed Sep. 29, 2021", 5 pgs.
"Wilger 2019-20 Manufacturer's Suggested Retail Price List", (Revised Sep. 1, 2019), 20 pgs.
Elmore, Clyde L., "Soil Solarization A Nonpesticidal Method for Controlling Diseases, Nematodes, and Weeds", University of California Division of Agriculture and Natural Resources Publication 21377, (1997), 1-17.
U.S. Appl. No. 18/355,926, filed Jul. 20, 2023, Configurable Nozzle Assembly and Methods of Same.
"European Application Serial No. 18735853.6, Communication Pursuant to Article 94(3) EPC mailed Apr. 3, 2023", 4 pgs.
"Canadian Application Serial No. 3,182,267, Examiners Rule 86(2) Report mailed Apr. 2, 2024", 7 pgs.
"Canadian Application Serial No. 3,185,961, Examiners Rule 86(2) Report mailed May 6, 2024", 3 pgs.
"European Application Serial No. 21827830.7, Extended European Search Report mailed Jun. 6, 2024", 6 pgs.
"European Application Serial No. 18735853.6, Response filed Sep. 12, 2023 to Communication Pursuant to Article 94(3) EPC mailed Apr. 3, 2023", 9 pgs.
"Australian Application Serial No. 2021297320, First Examination Report mailed Nov. 7, 2023", 2 pgs.
"U.S. Appl. No. 18/355,926, Preliminary Amendment filed Jan. 10, 2024", 6 pgs.
"U.S. Appl. No. 18/355,926, Preliminary Amendment", 6 pgs.
"Australian Application Serial No. 2021297320, Response filed Feb. 22, 2024 to First Examination Report mailed Nov. 7, 2023", 17 pgs.
U.S. Appl. No. 16/476,069, filed Jul. 3, 2019, Configurable Nozzle Assembly and Methods of Same.
"European Application Serial No. 21827830.7, Response filed Dec. 23, 2024 to Extended European Search Report mailed Jun. 6, 2024", 20 pgs.
"U.S. Appl. No. 18/355,926, Restriction Requirement mailed Dec. 3, 2024", 10 pgs.
"U.S. Appl. No. 18/355,926, Response filed Feb. 3, 2025 to Restriction Requirement mailed Dec. 3, 2024", 8 pgs.
"U.S. Appl. No. 18/355,926, Non Final Office Action mailed Feb. 12, 2025", 10 pgs.

(56)                 References Cited

OTHER PUBLICATIONS

"European Application Serial No. 24174311.1, Response filed Feb. 6, 2025 to Extended European Search Report mailed Jul. 10, 2024", 16 pgs.

"Canadian Application Serial No. 3,182,267, Office Action mailed Mar. 20, 2025", 4 pgs.

"U.S. Appl. No. 18/355,926, Response filed May 12, 2025 to Non Final Office Action mailed Feb. 12, 2025", 13 pgs.

"Brazil Application Serial No. BR112022026505-0, Office Action mailed May 13, 2025", with English translation, 7 pages.

"U.S. Appl. No. 18/355,926, Final Office Action mailed Jul. 15, 2025", 11 pgs.

"Australian Application Serial No. 2024204174, First Examination Report mailed Jul. 24, 2025", 2 pgs.

"Canadian Application Serial No. 3,182,267, Response filed Jul. 31, 2025 to Office Action mailed Mar. 20, 2025", 18 pages.

"Brazilian Application Serial No. BR112022026505-0, Response filed Aug. 11, 2025 to Office Action mailed May 13, 2025", with English translation, 203 pages.

"European Application Serial No. 24174311.1, Communication Pursuant to Article 943 EPC mailed Oct. 9, 2025", 4 pgs.

"European Application Serial No. 21827830.7, Communication Pursuant to Article 943 EPC mailed Nov. 25, 2025", 3 pgs.

"Australian Application Serial No. 2024204174, Response filed Dec. 8, 2025 to First Examination Report mailed Jul. 24, 2025", 1 pg.

"U.S. Appl. No. 18/355,926, Response filed Dec. 10, 2025 to Final Office Action mailed Jul. 15, 2025", 11 pgs.

"U.S. Appl. No. 18/355,926, Notice of Allowance mailed Jan. 30, 2026", 8 pgs.

"U.S. Appl. No. 18/355,926, Corrected Notice of Allowability mailed May 4, 2026", 2 pgs.

"Brazil Application Serial No. BR112022026505-0, Office Action mailed Apr. 12, 2026", w/o English Translation, 5 pgs.

"Canadian Application Serial No. 3,182,267, Office Action mailed Apr. 29, 2026", 5 pgs.

* cited by examiner

DUCT THROTTLED SPRAYER NOZZLE ASSEMBLIES AND METHODS FOR SAME

CROSS-REFERENCE TO RELATED PATENT DOCUMENTS

This patent application is also related to U.S. patent application Ser. No. 16/476,069, entitled "CONFIGUR-ABLE NOZZLE ASSEMBLY AND METHODS FOR SAME," filed on Jul. 3, 2019, which is hereby incorporated by reference herein in its entirety.

COPYRIGHT NOTICE

TECHNICAL FIELD

This document pertains generally, but not by way of limitation, to the sprayed application of fluid products (liquid or gaseous).

BACKGROUND

Agricultural sprayers are used to distribute agricultural products, such as fertilizers, insecticides, herbicides and fungicides to crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds or streams. Irregular field shapes and contour changes provide challenges in even distribution of agricultural products and can lead to waste of agricultural products. Additionally, the configuration of the agricultural sprayer itself may cause unpredictable variation in application of agricultural products.

Agricultural sprayers include a reservoir for a carrier substance. The carrier substance is used as a vehicle to carry and distribute one or more injection products dispersed into the carrier substance, for instance herbicides, pesticides, fertilizers or the like. The reservoir is in communication, by way of a header tube or pipe, with a plurality of sections provided along one or more carrier booms (e.g., boom tubes). The header is the main line extending between the reservoir and the carrier booms. Each of the plurality of sections includes multiple sprayer nozzles that distribute the carrier substance received by the section.

In some examples, each sprayer nozzle includes a control valve and an associated spray tip. The control valve provides a specified flow rate of the carrier substance and an injection product (collectively an agricultural product) to the spray tip. In other examples, the control valve is operated to open and close based on a duty cycle (e.g., opening and closing segments per unit time, such as per second, with higher duty cycles corresponding to a greater time the valve is open). The spray tip is configured to apply the agricultural product from the control valve with a spray pattern. In operation, the control valve provides the specified flow rate of the agricultural product for spraying from the spray tip. For instance, the control valve is operated with a duty cycle intended to deliver the specified flow rate of agricultural product to the spray tip.

OVERVIEW

The present inventors have recognized, among other things, that a problem to be solved can include minimizing errors in application flow rates of an agricultural product relative to a specified application flow rate. For example, in a sprayer nozzle assembly including a spray tip and a control valve (e.g., a pulse width modulation or PWM) the valve operator, such as a poppet, is moved between and held at open and closed positions multiple instances per unit time (e.g., a duty cycle of 1, 10, 15 or more Hz or opening/closing cycles per second). The opening portion of the operation ideally corresponds to the specified flow rate. Accordingly, at a duty cycle 10 Hz or the like a corresponding flow rate of the agricultural product is ideally administered through the spray tip downstream from the control valve.

In practice the actual flow rate through the spray tip does not, in some examples, correspond with the combination of specified flow rate and the associated duty cycle. Instead, the actual flow rate varies relative to the specified flow rate. For example, the residual agricultural product within the sprayer nozzle between the control valve and the spray tip continues to flow after the valve operator is closed and flow through the valve is arrested. The relative variation in flow between the specified and actual flow rates is further aggravated with operation at lower flow rates (e.g., with tip sizes of 04 or less) and at lower pressures (e.g., 30 psi or less). To an observer it sometimes appears that the sprayer nozzle fails to open and close according to the duty cycle, and instead the sprayer nozzle continues to apply agricultural product throughout operation counter to the specified duty cycle and flow rate. The actual flow rate of the agricultural product is greater than the specified flow rate. In some examples, significant agricultural product is errantly overapplied or misapplied. Additionally, the variation in flow rate (e.g., between specified and actual) is duplicated at a plurality of nozzles (potentially with each of the nozzles along a boom) further aggravating overapplication or misapplication.

Performance of a sprayer nozzle experiencing the increased actual flow rate relative to the specified flow rate is in some examples measured with pressure (or pressure drop). For instance, in previous examples the pressure in an interface duct extending between the control valve and the spray tip is above ambient pressure after closing of the valve indicating that agricultural product (the source of the measured pressure) continues to flow to the spray tip (at the lower ambient pressure) and is errantly overapplied or misapplied. In other examples, the pressure drop in the passage between the control valve and the spray tip (another example of a pressure measurement) gradual attenuates and thereby indicates continued flow of the agricultural product. In some examples, the measured tip pressure drop fails to reach zero psi (atmospheric pressure) before the next open portion of the valve duty cycle begins thereby indicating that agricultural product is errantly dispensed throughout the closed period of the duty cycle.

The present subject matter can help provide a solution to this problem, such as by modulating the interface profile (e.g., volume, cross sectional shape, size or area or the like) of an interface duct extending between the control valve and the spray tip. For instance, a sprayer nozzle assembly includes a control valve and a spray tip interconnected with an interface duct. The sprayer nozzle assembly includes a duct throttle within the interface duct that modulates (e.g., controls, decreases, increases or the like) the profile of the interface duct. As described herein, throttling the interface profile (e.g., volume, cross sectional shape, size or area or the like) of the interface duct increases a pressure drop in the sprayer nozzle assembly proximate to closing of the valve operator. For instance, the pressure drop indicates a change from the operating pressure of the fluid (e.g., 20 psi, 30 psi or the like) toward zero immediately proximate to the valve closing. The lower pressure (e.g., zero psi) is maintained within the interface duct until the control valve is opened in accordance with the duty cycle. The lower measured pressure indicates little or no flow is delivered through the spray tip while the control valve is closed and the actual flow rate thereby closely corresponds with the specified flow rate. With the duct throttle examples described herein the measured pressure drop is rapid and is proximate in time to closing of the control valve to enhance correspondence between the specified flow rate and the actual flow rate.

In one example, the duct throttle includes an insert received within the interface duct that decreases the profile (e.g., volume, cross sectional area, size or shape) of the interface duct. The insert is a profile filler, choke or the like that decreases the otherwise larger interface duct profile. Optionally, the insert is coupled with a sprayer tip (e.g., integral or separate to the tip) and installed in the interface duct during coupling of the sprayer tip with the duct.

In another example, the duct throttle includes a throttle mechanism such as, but not limited to one or more of a bladder, collar, operable choke element, movable wall surface or the like configured to dilate the interface duct (e.g., a passage of the interface duct) according to one or more of a specified flow rate, actual flow rate, pressure, spray tip characteristic or the like (e.g., spray characteristics). The duct throttle in this example dynamically controls the profile of the interface duct with actuation of the throttle mechanism including, but not limited to, inflation or deflation of a bladder, contraction or expansion of a collar, movement of a choke element, movement of a wall surface or the like to modulate the interface profile of the interface duct. For instance, the duct throttle is expanded or actuated proximate to the 'off' portion of the duty cycle (e.g., proximate to valve closure) to decrease the duct profile, and compressed or relaxed proximate to the 'on' portion of the duty cycle (e.g., proximate to valve opening) to increase the duct profile.

In examples including measurements of fluid characteristics, such as pressure or flow rate, the duct throttle is actuated based on the measurements. For instance, after closure of a valve a measured pressure in the interface duct ideally should trend toward zero psi (atmospheric pressure). If the pressure measurement instead gradually approaches zero psi (indicating flow from the spray tip beyond an acceptable span of time, such as more than 20 milliseconds) the duct throttle is actuated with a throttle controller to decrease the interface duct profile (one or more volume, cross sectional area, size, shape or the like). The decrease in duct profile causes a more rapid decrease in pressure after closure of the valve (e.g., within 20 ms or less) and accordingly indicates minimized flow of agricultural product from the spray tip after closure of the valve.

Conversely, if the pressure measurement approaches zero psi within around 10 milliseconds, 20 ms or the like, and before initiation of the next opening of the valve, actuation of the duct throttle is minimal (and optionally includes no actuation and maintaining the full duct profile). In another example, actuation of the duct throttle with the throttle controller is scaled based on timed pressure measurements. For instance, if pressure measurements trend toward zero psi within around 10 ms of the closure of the control valve throttle actuation is minimal (including no actuation). If pressure measurements trend toward zero psi around 20 ms of valve closure (10 ms longer, and an attenuated response with greater post-closure errant application) the actuation of the duct throttle is graduated (e.g., to decrease the interface duct profile) to decrease the time to zero psi (e.g., greater actuation for pressures indicating flow proximate to 20 ms and lesser actuation for pressures indicating minimal flow proximate to 10 ms).

Optionally the throttle controller described herein operates the duct throttle in a graduated fashion based on measured flow rates in contrast to pressure, for instance scaling actuation of the duct throttle and the corresponding profile decrease from the throttle based on flow rate measurements after closure of the valve. For example, at measured flow rates trending toward zero gallons per minute (gpm) proximate to 10 ms of valve closure throttling of the interface profile is minimal. At measured flow rates trending toward zero gpm at times greater than 10 ms the duct throttle is actuated in a graduated manner (to gradually decrease the duct profile) to arrest flow of the agricultural product more rapidly (e.g., closer to 10 ms). For instance, the duct profile is decreased more significantly for flow measured at 20 ms or later after valve closure while the duct profile is decreased less significantly if flow is measured at 10 ms or less after valve closure.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
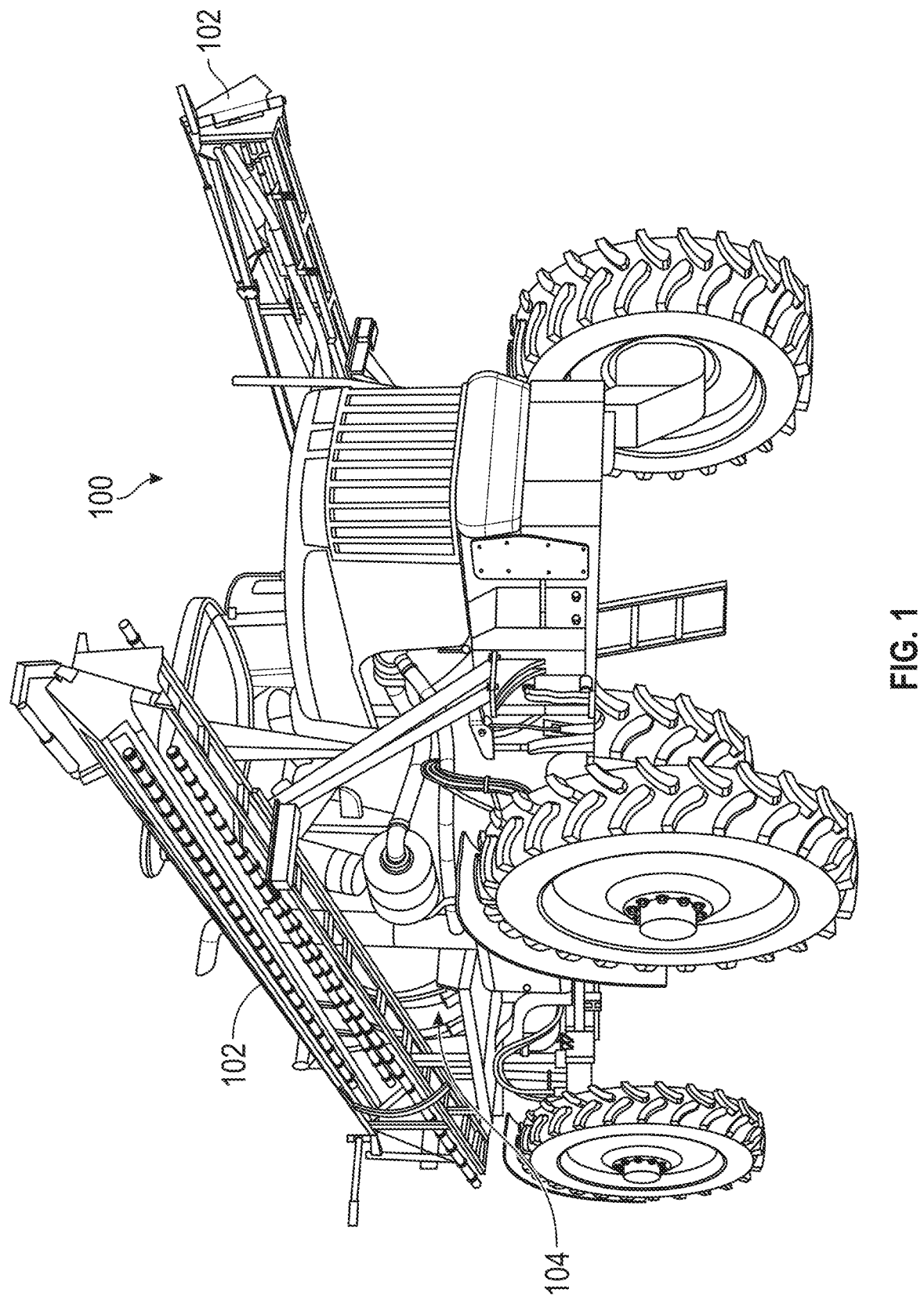
FIG. 1 is a perspective view of one example of an agricultural sprayer.

FIG. 1 is a perspective view of one example of an agricultural sprayer 100. The sprayer 100 includes one or more sprayer booms 102 (herein booms, spray booms or the like). The sprayer booms 102 each include sprayer nozzles that apply an agricultural product, such as a carrier fluid having one or more additives such as injection products, to crops as the sprayer 100 moves through a field. The agricultural product is contained in an agricultural product reservoir 104. In another example, a carrier fluid is contained in a carrier fluid reservoir and one or more injection products are contained in respective injection product reservoirs. The injection products are mixed with the carrier fluid to provide the products at specified concentrations relative to the carrier fluid. This mixing is optionally conducted proximate to the reservoirs (e.g., upstream relative to sprayer nozzles) or downstream, for instance proximate to the sprayer nozzles to facilitate rapid changes in composition, concentration or the like of the injection products in the carrier fluid immediately prior to spraying.

As discussed herein, the sprayer nozzles are in communication with associated control valves that control the flow rate of the agricultural product to the sprayer nozzles. In one example, the control valves include valve operators that are opened and closed according to a specified duty cycle. Operation of a control valve at a specified duty cycle (e.g., the valve is open for a corresponding portion of a, cycle, length of time or time span, such as 10 Hz) delivers agricultural product to the sprayer nozzle for spray application at a flow rate corresponding to the duty cycle. As the specified duty cycle is increased or decreased the portion of the cycle the valve is open and permits flow is increased or decreased, respectively.

Figure 2:
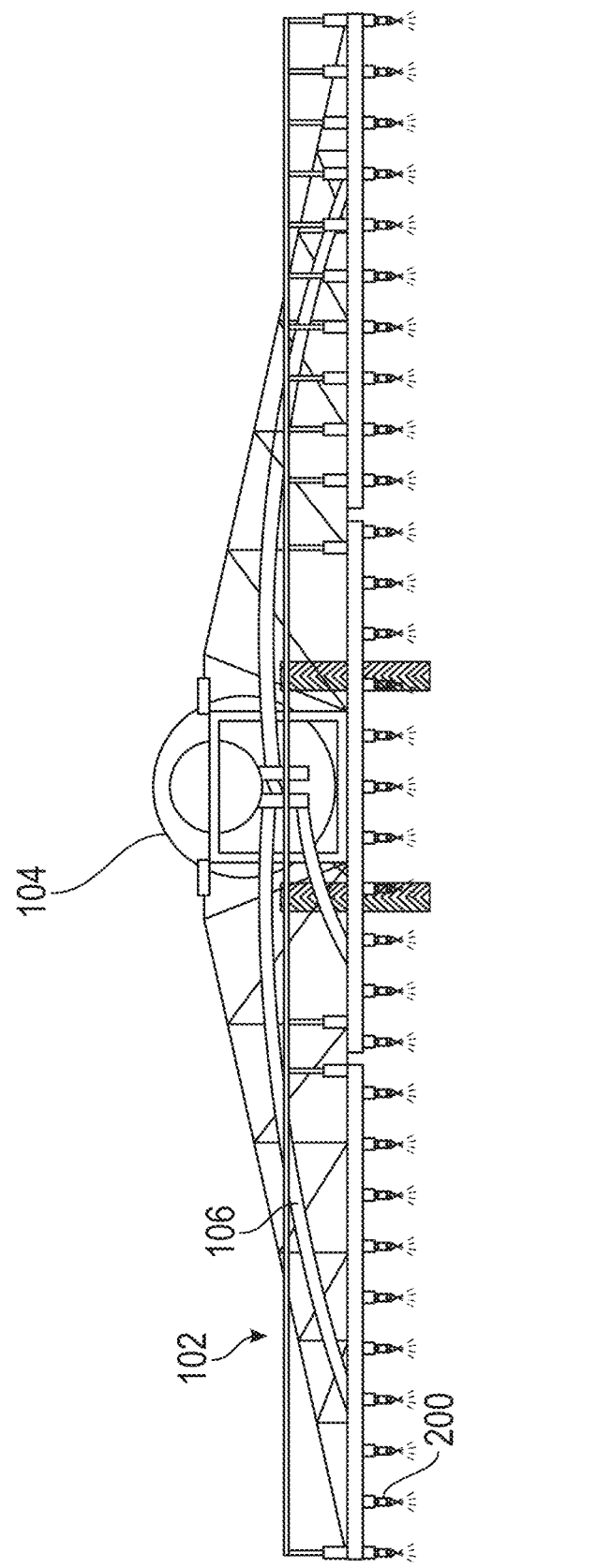
FIG. 2 is a schematic view of the agricultural sprayer of FIG. 1.

FIG. 2 is a schematic view of the sprayer 100 including the agricultural product reservoir 104 and the sprayer booms 102. The sprayer booms 102 each include a plurality of sprayer nozzle assemblies 200. Tubing, piping or the like, referred to herein as boom tubes 106, are in communication with the agricultural product reservoir 104 and the sprayer nozzle assemblies 200, and deliver agricultural product from the reservoir 104 to the sprayer nozzle assemblies 200 for application. In one example, the sprayer nozzle assemblies 200 are arrayed in sections, such as center, left and right sections, and the sections are in communication with respective boom tubes 106, for instance to facilitate independent control of sprayer application in a section relative to the other sections (e.g., control of flow rate, concentration or composition of the agricultural product). In other examples, the sprayer nozzle assemblies 200 are each in independent communication with the boom tubes 106 to facilitate independent flow rate, concentration or composition control of the agricultural product at each sprayer nozzle assembly, for instance as shown in FIG. 3.

As discussed herein errant application is a potential issue for sprayer nozzle assemblies, such as the assemblies 200 shown in FIG. 2. For instance, the gradual attenuation of pressure after control valves are closed in a cyclical operation scheme (e.g., with valves operated at duty cycles) is indicative of continued application of agricultural products while the control valves are closed. The duct throttles, and sprayer nozzle assemblies and control valves including the duct throttles discussed herein, address the continued application phenomenon and minimize it (e.g., decrease or eliminate) to thereby correspond an actual flow rate of the agricultural product with the specified flow rate of the agricultural product.

Figure 3:
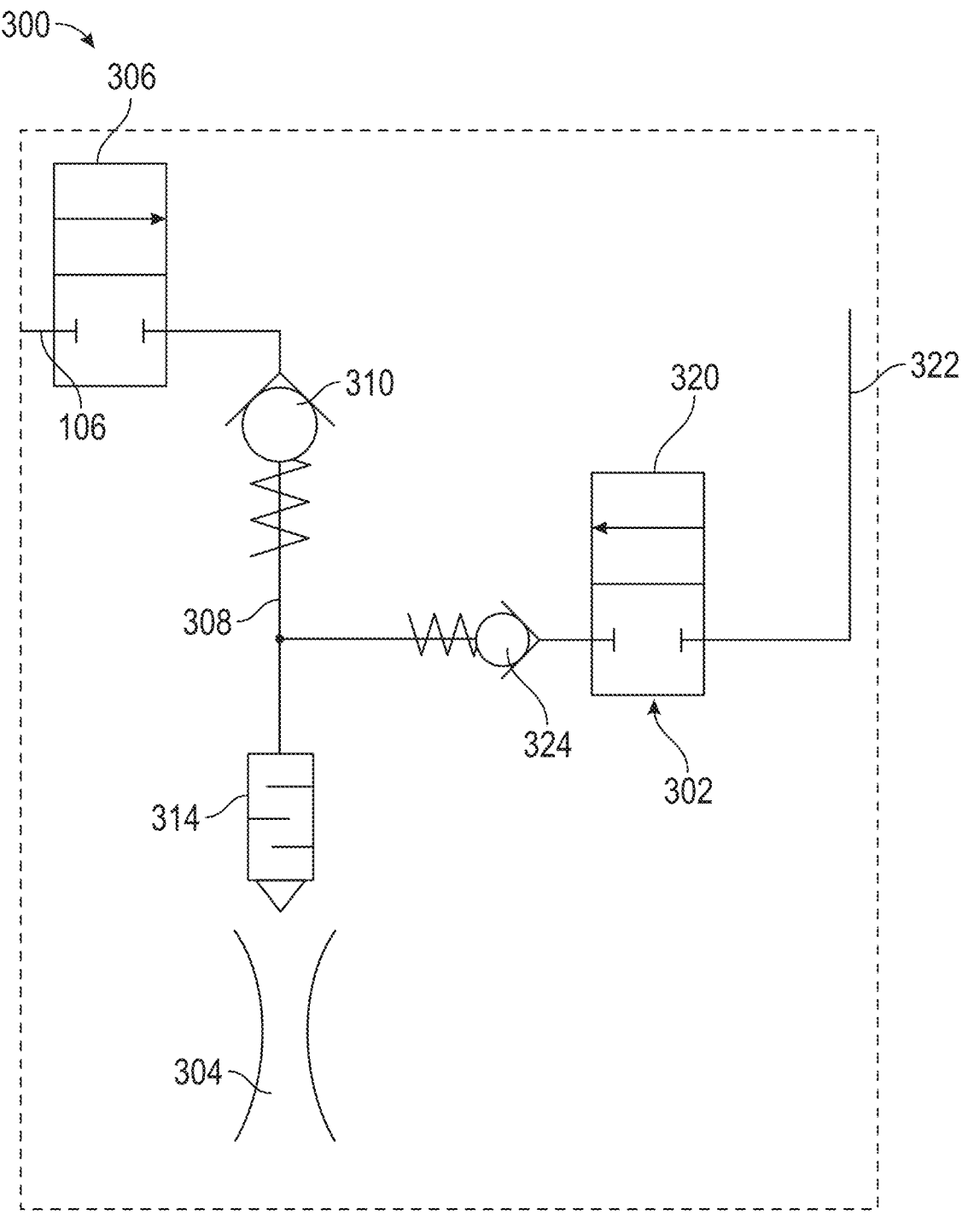
FIG. 3 is a schematic view of one example of a sprayer nozzle assembly.

FIG. 3 is a schematic view of a sprayer nozzle assembly 300, for instance an assembly is optionally used as one or more of the sprayer nozzle assemblies 200 in FIG. 2. In the example shown in FIG. 3 the sprayer nozzle assembly 300 provides localized concentration (including composition) control of an injection product to carrier fluid proximate to a spray tip 304 (e.g., immediately adjacent, at the spray tip, remote from the carrier or injection product reservoirs or the like) with one or more injection control valves 320. The injection control valves 320 graduate the flow of injection products from associated injection product reservoirs to the carrier fluid proximate to the spray tip.

In another example, the sprayer nozzle assembly 300 does not include localized control of an injection product. Instead, the injection product is premixed or mixed upstream relative to the control valve 306, and the injection line 322 and injection control valve 320 are absent from the sprayer nozzle assembly 300.

Referring again to FIG. 3, the sprayer nozzle assembly in this example includes a spray tip 304 having a tip orifice with a tip profile (a static or adjustable orifice size, shape, cross sectional area, flow rate for a specified pressure or the like). In another example, the spray tip 304 includes a plurality of tip orifices including an exterior facing tip orifice and one or more pre-orifices to facilitate increased droplet size (e.g., with a smaller pre-orifice opening into the exterior facing tip orifice). The spray tip 304 administers agricultural product received from the control valve 306 (and optionally the injection control valve 320) in a specified spray pattern, for instance for application to crops, weeds, pests, soil or the like.

As further shown in FIG. 3, the sprayer nozzle assembly 300 includes at least one control valve 306 configured to graduate the flow of a carrier fluid (with localized injection) or the agricultural product (in the example without localized injection) from the boom tube 106 to the spray tip 304 through an interface duct 308. The interface duct 308 extends from the control valve 306 to the spray tip 304, and optionally includes a side or peripheral duct extending from the injection control valve 320 (where included) The control valve 306 graduates the flow rate to the spray tip 304 between 'off' and fully 'on' flow rates, and optionally one or more (including infinite) flow rates therebetween. In one example, the control valve 306 includes a movable valve operator, such as a poppet, that is moved between open and closed positions, and retained in the open and closed positions for specified periods to control the flow rate through the valve to the spay tip 304. For instance, the control valve 306 includes a solenoid actuator that actuates the valve operator according to a specified duty cycle (e.g., percentage of 'on' or 'open' over a unit of time) that corresponds to a specified flow rate of the agricultural product (or carrier fluid). The specified duty cycle is varied by a controller according to prescribed variations in agricultural product (or carrier fluid) flow rate, for instance based on field conditions, crop conditions, identified weeds or pests or the like. In some examples the control valve 306 is referred to as a pulse width modulated (PWM) control valve, normally closed valve (NCV) or the like.

The example sprayer nozzle assembly 300 shown in FIG. 3 further includes an optional injection assembly 302 having the injection control valve 320 configured to graduate the flow of injection product from an injection line 322 (e.g., a dedicated supply line or tube that carries the injection product) to the carrier fluid in the interface duct 308. The injection assembly 302 facilitates the introduction of one or more additives (also referred to as injection products) to the carrier fluid. In the example including injection of the injection product a unidirectional valve 310 is provided in the interface duct 308 between the control valve 306 and the spray tip 304 and an injection unidirectional valve 324 is interposed between the injection control valve 320 and the spray tip 304. A mixer 314 including vanes, fins or the like is provided to mix the injection product and carrier fluid prior to application through the spray tip 304.

The injection control valve 320 is in one example a PWM or NCV having a movable valve operator that facilitates the graduated introduction of an injection product to the carrier fluid. For instance, the injection control valve 320 is operated according to a specified (injection) duty cycle to introduce a corresponding flow rate of the injection product to the carrier fluid and thereby provide a corresponding specified concentration (or composition) of the injection product in the carrier fluid. For instance, the injection control valve 320 includes a solenoid actuator that actuates the valve operator according to a specified duty cycle (e.g., percentage of 'on' or 'open' over a unit of time) that corresponds to a specified flow rate of the injection product. The injection control valve 320 is in one example actuated in concert with the control valve 306 for the carrier fluid to maintain a concentration of the injection product in the carrier fluid as the flow rate of the carrier fluid is controlled (e.g., increased, decreased or maintained). For instance, the injection product flow rate at the injection control valve 320 is graduated up and down with respective increases and decreases of the carrier fluid flow rate (e.g., controlled with the control valve 306). In still other examples, the injection control valve 320 is operated relative to the control valve 306 to modulate the concentration or composition of the injection product in the carrier fluid. For instance, the injection product flow rate is increased or decreased with the injection control valve 320 to modulate the concentration of the injection product in the carrier fluid (e.g., increase, decrease or maintain), and accordingly provide a mixed agricultural product for application with a specified concentration.

Figure 4A:
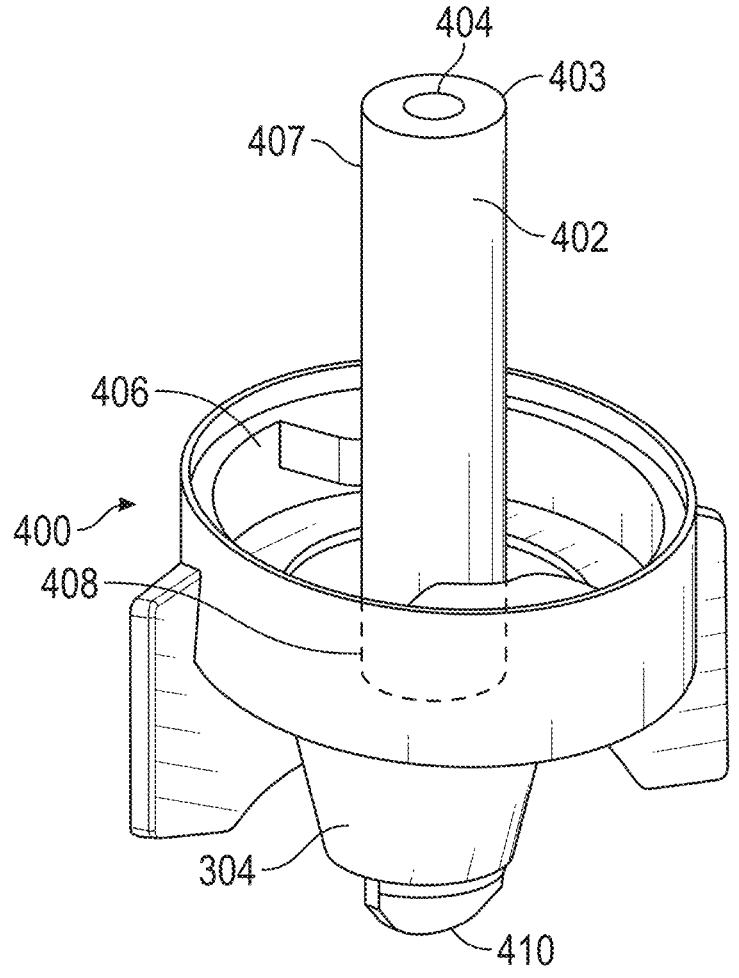
FIG. 4A is a perspective view of a sprayer tip assembly including one example of a duct throttle.

FIG. 4A is a perspective view of an example tip assembly 400 and a duct throttle 402. As discussed herein the duct throttle 402 modulates (e.g., controls, decreases, increases or the like) the profile of the interface duct to minimize misapplication of agricultural product from the spray tip 304, for instance to ensure the sprayer nozzle assembly including the tip assembly 400 provides an actual flow rate of agricultural product that corresponds with a specified flow rate of the agricultural product (e.g., matches, is substantially similar or the like). As described herein, throttling the interface profile (e.g., volume, cross sectional shape, size or area or the like) of the interface duct 308 increases a pressure drop in the sprayer nozzle assembly proximate to closing of the valve operator. The increased pressure drop is indicative of a decreasing flow rate of the agricultural product after closing, and thereby minimizes (reduces or eliminates) errant application of agricultural product while the control valve is closed, and when there should ideally be no flow. The lower pressure (e.g., zero psi) is maintained within the interface duct until the control valve is opened in accordance with the duty cycle. The duct throttle 402 and other example duct throttles described herein enhance pressure drop proximate in time to closing of the control valve to closely correspond the actual flow rate with the specified flow rate of the agricultural product.

Referring again to FIG. 4A, the example tip assembly 400 includes the spray tip 304 having the tip orifice 410. The tip orifice 410 and its associated profile (e.g., the shape and size of the spray tip surrounding the orifice 410) provide a specified spray pattern of the agricultural product, droplet size or the like (herein, spray characteristics). In the example shown in FIG. 4A the tip assembly 400 includes a duct seat 406 configured for coupling with the interface duct 308, shown schematically in FIG. 3. The tip assembly 400 is coupled with the sprayer nozzle assembly 300 having the interface duct 308, for instance through a mechanical fitting including, but not limited to, threading, a bayonet fitting, snap fit or the like.

The tip assembly 400 shown in FIG. 4A includes a throttle socket 408 configured to receive a portion of the duct throttle 402. In the example shown in FIG. 4A the duct throttle 402 has a cylindrical profile and the throttle socket 408 has a corresponding profile for reception of an end portion of the duct throttle 402. In other examples the duct throttle 402 is integral to the tap assembly 400 without the intervening throttle socket 408.

The duct throttle 402 extends from the throttle socket 408. The duct throttle in this example is an insert that is positioned within the interface duct 308. In another example, tip assemblies 400 include a plurality of interchangeable duct throttles 402 with different throttle profiles (e.g., volume, shape, size, length, cross sectional area or the like) to provide options for installation by the user to achieve specified performance (e.g., pressure drop within a set time after closure or the like). In other examples, the duct throttle 402 includes an interface duct 308 having a different cross sectional area and corresponding interface duct profile (e.g., volume, cross sectional area, cross sectional diameter or dimension such as length). The interface duct 308 in this example serves as its own duct throttle 402. Optionally, the installation of such a duct throttle 402 accordingly provides a specified interface duct with a corresponding specified duct profile. The duct profile may include a modulated (e.g. increased or decreased) interface duct cross sectional area or length. For instance, a shorter duct throttle 402 positions the spray tip 304 in closer proximity to the control valve 306 to accordingly minimize the duct profile by decrease the interface duct length.

As shown, the duct throttle 402 includes a throttle sidewall 403 and a product passage 404 extending through the throttle 402. The product passage 404 communicates agricultural product from the control valve 306 (or 306 and 320) to the spray tip 304. The throttle sidewall 403 provides a throttle profile that fills a portion of the interface duct 308 and modulates the duct profile (e.g., constricts the duct, modifies the duct or replaces the duct) to decrease the initial duct profile and cause a controlled pressure drop with closing of the valve that minimizes errant application of agricultural product after closing of the control valve (e.g., from the interface duct 308 between the control valve and the spray tip 304). The constricted product passage 404 promotes pressure drop between the control valve 306 and the spray tip 304, and accordingly minimizes (reduces or eliminates) flow of the agricultural product after closure of the control valve 306.

In an example, the duct throttle profile (also referred to as a throttle profile) including one or more of the throttle sidewall 403 characteristics such as inner and outer diameters, throttle length or the like are specified based on a relationship between the spray tip 304 (e.g., one or more orifices associated with the tip) and a specified volume of the interface duct 306. For instance, a controlled pressure drop (e.g., toward zero psi proximate to the time of valve closure) is realized with a modulated duct throttle profile provided by the duct throttle 402 matched to the tip orifice profile. The duct throttle 402 is selected and installed to modulate the duct profile of the interface duct 308 by way of the duct throttle profile (or throttle profile) and thereby achieve the specified pressure drop and minimize errant application of the agricultural product.

In the example shown in FIG. 4A the duct throttle 402 and the throttle sidewall 403 are unbroken, for instance without perforations, penetrations or the like between the duct seat 406 and a distal portion 407 of the duct throttle 402. In other examples, the duct throttle 402 includes one or more features including, but not limited to, perforations, grooves, recesses, fins, ridges, knurling or the like to modulate the pressure drop between a control valve and the spray tip 304.

Figure 4B:
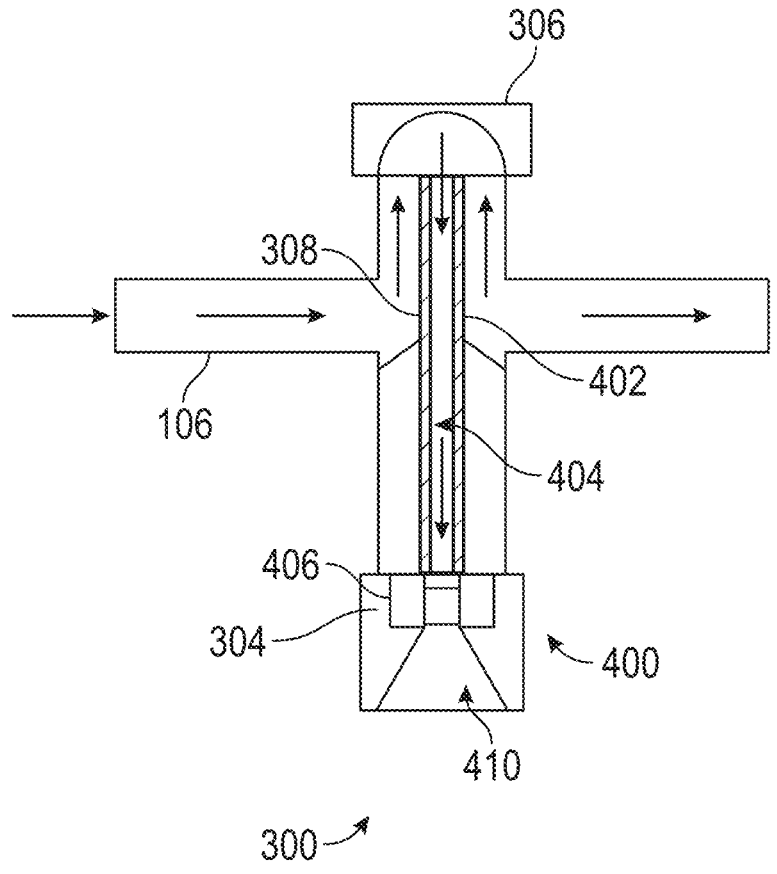
FIG. 4B is another schematic view of the sprayer nozzle assembly of FIG. 3 including the sprayer tip assembly of FIG. 4A.

FIG. 4B is another schematic example of the sprayer nozzle assembly 300 previously shown in FIG. 3. In this example, the sprayer nozzle assembly 300 includes the duct throttle 402 installed within the interface duct 308 to provide the modified duct profile. The sprayer nozzle assembly 300 shown in FIG. 4B is one example of a sprayer nozzle assembly having a control valve 306 for an agricultural product including a carrier fluid and one or more injection products (additives), and is shown without an associated injection control valve 320 (shown in FIG. 3).

The flow of agricultural product is illustrated in FIG. 4B with the agricultural product delivered through the boom tube 106 to the control valve 306, and from the control valve 306 through the interface duct 308 (and the duct throttle 302) to the tip assembly 400 having the spray tip 304. The agricultural product is delivered from the spray tip 304 through the tip orifice 410.

The duct throttle 402 is received in the interface duct 308. For instance, the duct throttle 402 extends from the duct seat 406 of the tip assembly 400 coupled with the sprayer nozzle assembly 300. As shown the agricultural product travels through the product passage 404 of the duct throttle instead of filling the entire volume of the interface duct 308. The constriction provided by the duct throttle 402 enhances the pressure drop between the control valve 306 and the tip orifice 410 of the spray tip 304 and minimizes errant application of the agricultural product.

In the example shown the duct throttle 402 is an insert that is installed in existing interface duct 308 of the sprayer nozzle assembly 300. In another example, the duct throttle 402 is itself the interface duct 308 and is coupled between the control valve 306 and the spray tip 304. In other examples, the duct throttle 402 is removably coupled with the tip assembly 400, for instance in a throttle socket 408 (shown in FIG. 4A) to facilitate the installation of different duct throttles 402 (in the manner of a kit of throttles), for instance each having a throttle profile corresponding to specified ranges of agricultural product flow rates. Optionally, the duct throttle 402 is integral to the tip assembly 400, and a kit of tip assemblies 400 are provided that provide the specified throttle profiles corresponding to specified agricultural product flow rates.

Figure 5A:
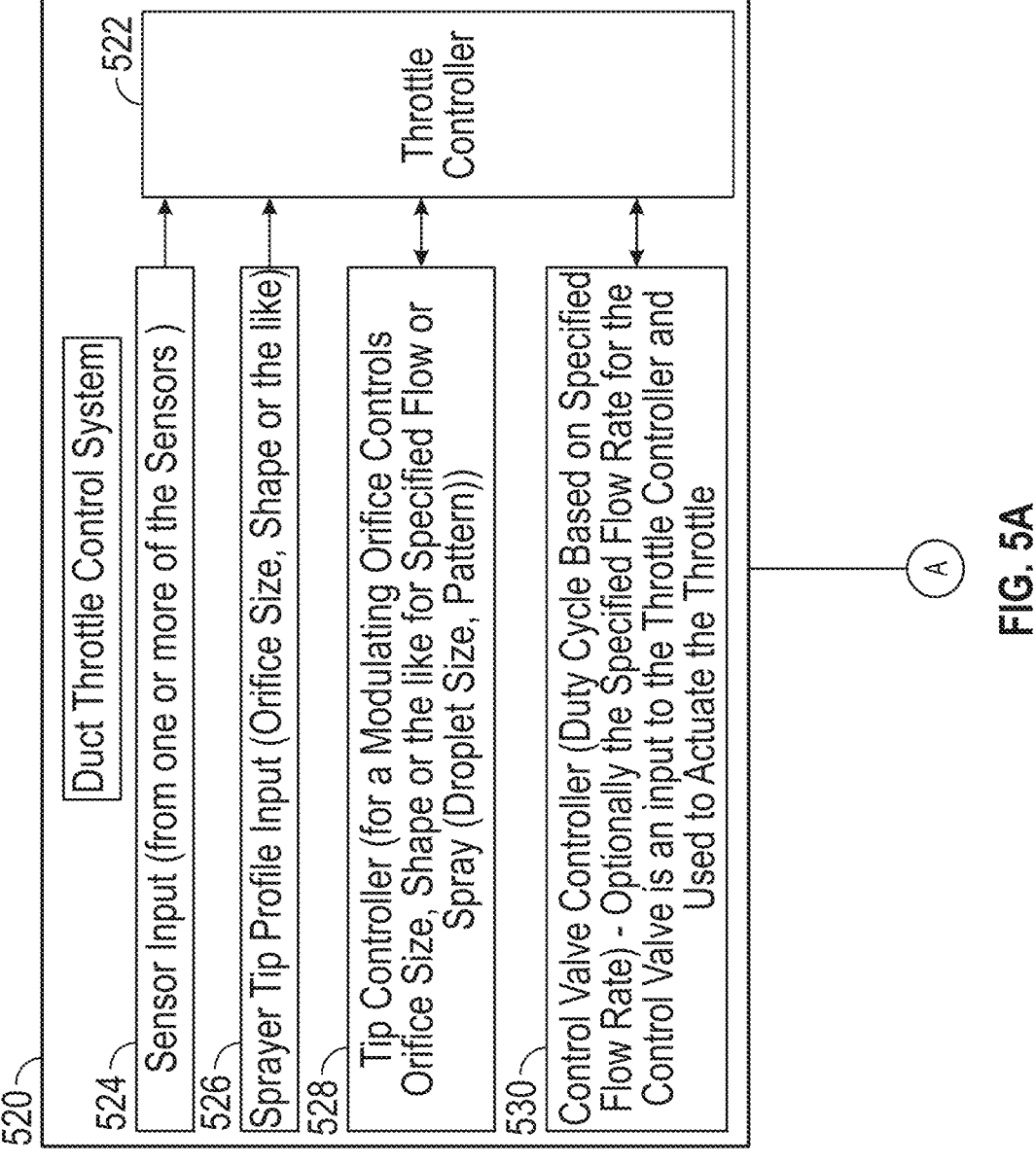
FIG. 5A is a schematic view of one example of a duct throttle control system in communication with a plurality of sprayer nozzle assemblies having duct throttles.
Figure 5A:
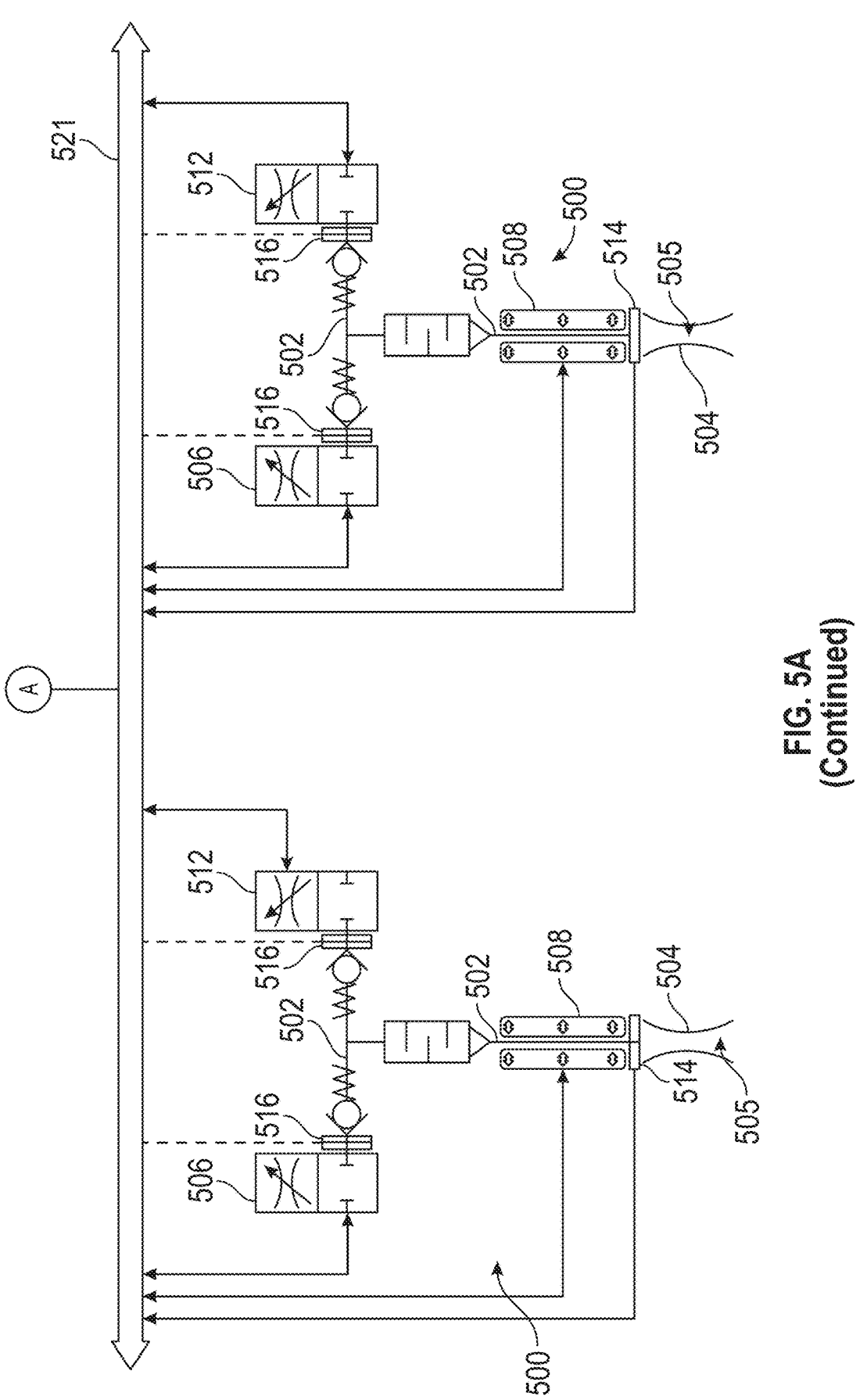

FIG. 5A is a schematic representation of an example duct throttle control system 500 including one or more duct throttles 508. The duct throttles 508 shown in FIG. 5A are configured for actuation, for instance to dynamically change the interface duct profile (e.g., duct profile including one or more shape, duct cross section, volume or the like) and thereby enhance pressure drop with closing of one or more associated control valves to minimize errant application of agricultural product. As discussed herein, in one example, the duct throttles 508 are in communication with a throttle controller 522 (e.g., optionally a component of the duct throttle control system 520). The throttle controller 522 actuates the duct throttle 508 to minimize errant application of agricultural product, for instance after the one or more control valves 306, 320 are closed (when arresting of the application of agricultural product is specified to occur). As discussed herein, the throttle controller 522 receives one or more inputs including sensor inputs 524, a sprayer tip profile input 526, signals from a tip controller (e.g., including a specified tip profile for a modulating tip or the like), fluid characteristics (e.g., pressure or specified flow rate of the agricultural product, for instance from a control valve controller 530 or flow meter). The throttle controller 522 actuates the duct throttle 508 minimize errant fluid flow from the spray tip, and in examples including one or more of the inputs described herein actuates the duct throttle 508 based on the respective inputs (e.g., according to measured pressure, flow rate, tip profile or the like).

As further shown in FIG. 5A, the duct throttle control system 520 in this example is in communication with a plurality of sprayer nozzle assemblies 500, for instance with an interface 521 such as, a bus, wiring harness, wireless network or the like. As discussed herein, in addition to the duct throttle 508, one or more other components of the sprayer nozzle assemblies 500 are also interconnected with the duct throttle control system 520 and the throttle controller 522. For instance, the sprayer nozzle assemblies 500 include one or more control valve sensors 512 (e.g., one or more of pressure or flow rate) provided along interface ducts 520, sensors 514 proximate to the sprayer tips 504 or the like. In other examples, one or more of the control valve 506 or injection control valve 512 of each sprayer nozzle assembly 500 is in communication with the throttle controller 522.

In the example shown in FIG. 5A, each of the sprayer nozzle assemblies 500 includes a control valve 506 coupled with an interface duct 502, and the interface duct 502 extends to an associated sprayer tip 504. In this example, the sprayer nozzle assemblies 500 are configured for localized injection of injection products (additives, such as fertilizers, pesticides, herbicides or the like) proximate to the sprayer tip 504. For instance, an injection control valve 512 provides a controlled flow of the injection product to the interface duct 502 for mixing with a carrier fluid (provided through the control valve 506). In another example, the sprayer nozzle assembly 500 includes the control valve 506, the injection control valve 512 is absent, and the control valve 506 provides a controlled flow rate of a premixed agricultural product to the sprayer tip 504. The one or more control valves 506, 512 provide a controlled flow rate of one or more of the agricultural product, carrier fluid or injection products including fully 'off' and fully 'on' flow rates as well intermediate flow rates (e.g., graduated flow rates between fully off and fully on). The control valves 506, 512 include, but are not limited to, pulse with modulation (PWM) valves, PWM valves having a variable orifice, ball valves, needle valves, butterfly valves or the like. In an example, including PWM valves, the valve operator is moved between open and closed positions in a reciprocating manner according to a specified duty cycle to provide varied flow rates through the valve (e.g., based on variations in the duty cycle implemented at the control valve).

As further shown, the sprayer nozzle assemblies 500 each include a sprayer tip 504 having an associated tip orifice 505. The sprayer tip 504 optionally includes one or more sprayer tips on a movable bracket having different tip profiles (e.g., orifice sizes, shapes or the like). In another example, the sprayer tip 504 includes a modulating orifice (e.g., adjustable tip profile such as orifice plate(s) shown in FIG. 5B) to vary the tip profile. As discussed herein, in an example, the duct throttle 402 is selected (e.g., with a throttle insert or replacement duct) based in part on the tip profile. A relatively smaller tip profile is married with a corresponding smaller duct throttle 402 that provides a smaller duct profile. Conversely, a relatively larger tip provide is married with a larger duct throttle 402 providing a larger duct profile. In another example, the duct throttle 508 shown in FIG. 5A is actuated with the throttle controller 522 based on the tip profile (whether set based on tip selection or with control of the tip orifice as in FIG. 5B). For instance, throttle actuation that decreases the interface duct profile (volume, shape or size of the duct, cross sectional area, length or the like) is applied for small tip profiles (e.g., orifices), and throttle actuation that relatively increases the interface duct profile (including leaving the duct profile at its initial profile) is applied for relatively larger tip profiles. In the example including a modulating orifice, for instance controlled with the tip controller 528 of the duct throttle control system 520, the modulated tip profile is communicated to the throttle controller 522 for control of the throttle profile.

The duct throttles 508 shown with the sprayer nozzle assemblies 500 in FIG. 5A are one example of modulating throttles that vary the associated throttle profiles to correspondingly change the duct profiles, for instance to minimize misapplication of agricultural product as discussed herein. For example, the duct throttle 508 includes a modulating throttle configured to control the associated throttle profile (e.g., decreasing, increasing or maintaining) and thereby control the duct profile (e.g., shape, duct cross section size, volume or the like) of the interface duct 502. The modulating duct throttle enhances pressure drop with closing of the control valve (or valves) and minimizes errant application of the agricultural product. As discussed herein, in an example, the duct throttles 508 are in communication with one or more throttle controllers 522 (e.g., of the duct throttle control system 520) that control actuation of the duct throttles to achieve specified throttle profiles and associated duct profiles.

Figure 6:
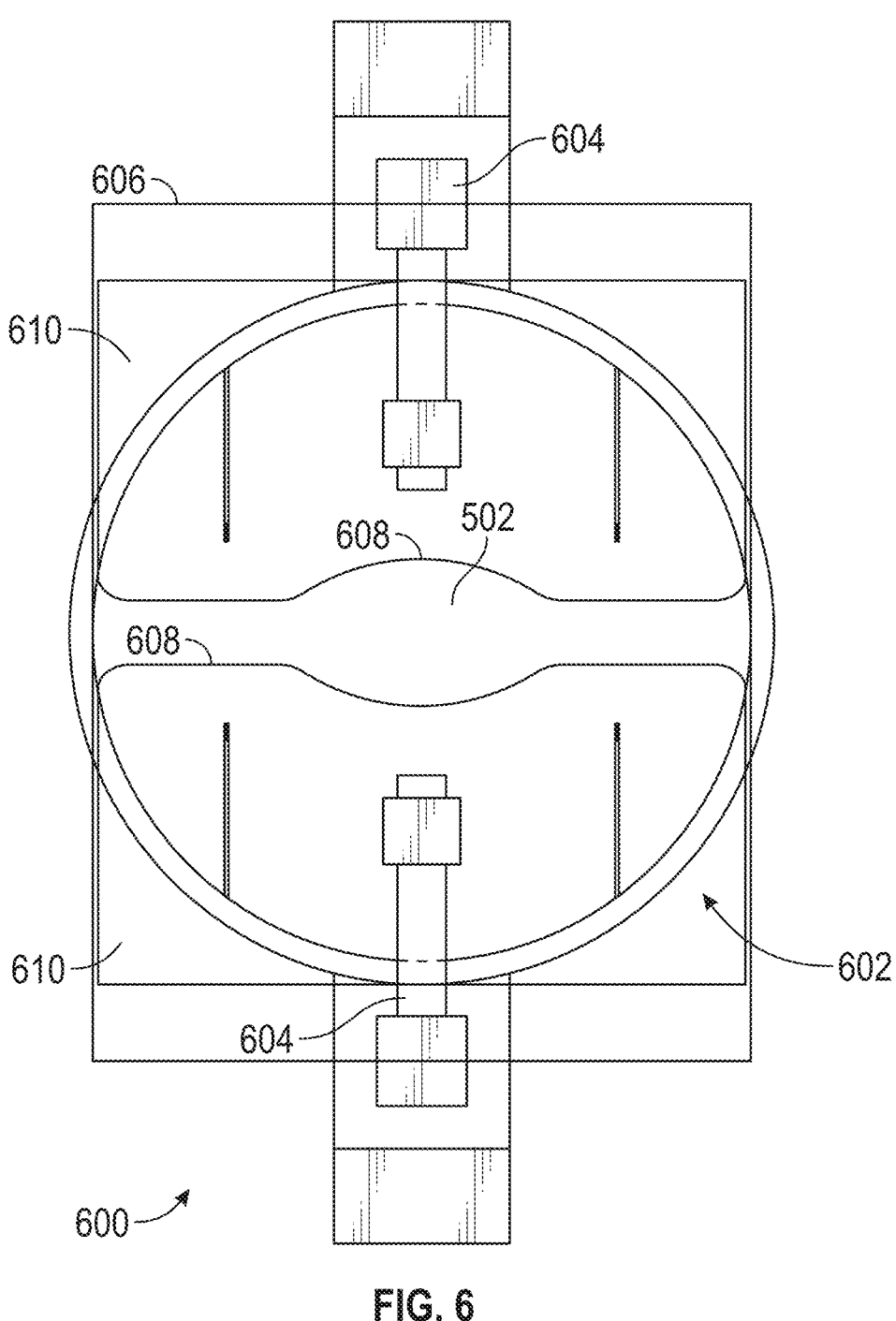
FIG. 6 is a cross sectional view of a sprayer nozzle assembly including another example of a duct throttle having an adjustable wall surface as a throttle mechanism.
Figure 7:
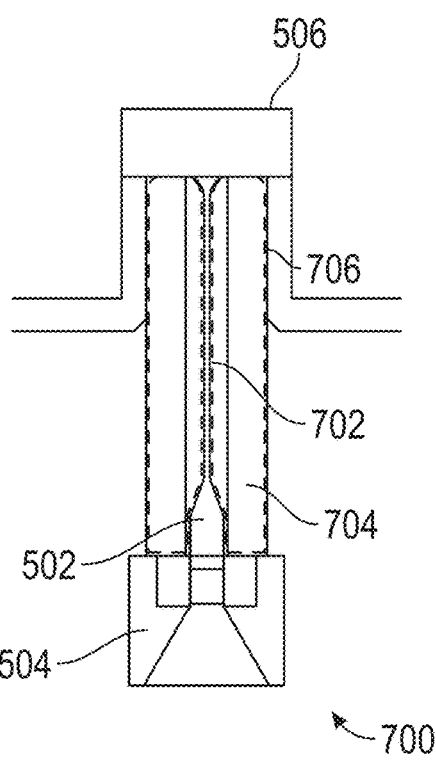
FIG. 7 is a schematic view of a sprayer nozzle assembly including an additional example of a duct throttle having a bladder as a throttle mechanism.
Figure 8:
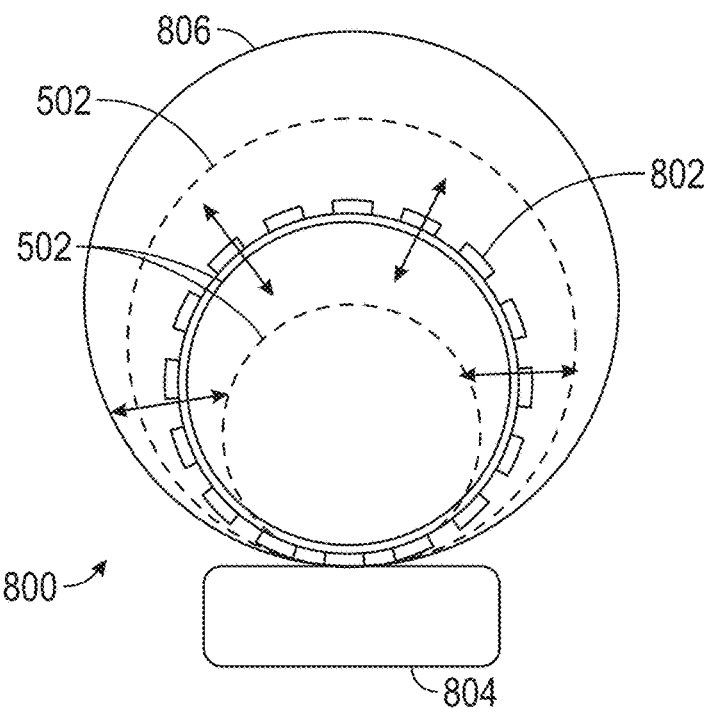
FIG. 8 is a schematic view of a sprayer nozzle assembly including a supplemental example of a duct throttle having a collar as a throttle mechanism.

The modulating duct throttles 508 include one or more types of throttles that permit variation of the throttle profile and the associated duct profile. Examples of duct throttles are shown in FIGS. 6-8 and described herein. The modulating duct throttles include one or more throttle mechanisms that are operable to change the throttle profile of the duct throttle 508 (e.g., cross section, width, length, volume shape or the like) to correspondingly change the duct profile of the interface duct 502. For instance, in one example, expansion of the modulating duct throttle 508 with a throttle mechanism inflates a bladder and accordingly increases the throttle profile of the duct throttle 508. The increased throttle profile of the duct throttle fills a portion of the interface duct 502 and thereby decreases the duct profile. A product passage extending through the interface duct 502 and optionally through the duct throttle 508 is accordingly decreased, and pressure drop in the interface duct 502 between the associated control valve 506 and the sprayer tip 504 is increased thereby throttling errant flow of the agricultural product in the interface duct 502 after closure of the valve 506.

In operation, the duct throttle control system 520 shown in FIG. 5A modulates the one or more duct throttles 508 associated with the sprayer nozzle assemblies 500. As discussed herein, in one example, the sprayer nozzle assemblies 500 have one or more sensors including, for instance, control valve sensors 516 associated with one or more of the control valve 506 or the injection control valve 512 or a sensor 514, for instance, associated with or proximate to the sprayer tip 504. The one or more sensors 516, 514 are configured to measure one or more characteristics between the control valves 506, 512 and the sprayer tip 504 (e.g., within or along the interface duct 502). The characteristics measured include, but are not limited to, one or more of pressure, flow rate or the like within the interface duct 502. As previously described, the measurement of one or more characteristics including flow rate or pressure (e.g., relative to atmospheric pressure) indicates a flow of agricultural product through the interface duct 502 and through the tip orifice 505 of the associated sprayer tip 504 even after closure of one or more of the control valves 506, 512. In this example, the flow of agricultural product after closure of these valves indicates errant application of the agricultural product from the sprayer tip 504 outside of a specified flow rate of the agricultural product.

The measurements conducted with one or more of the sensors 514, 516 shown in FIG. 5A are used as sensor inputs 524 for the duct throttle control system 520. For instance, a flow rate or pressure measured in the interface duct 502 after closure of the control valves 506, 512 indicates a continued flow of the agricultural product. In one example, the throttle controller 522 is configured to receive the sensor inputs 514, 516 and accordingly increase the throttle profile, for instance, by way of modulating the duct throttle 508 and thereby change one or more features of the interface duct 502.

As previously described, modulating of the duct throttle 508 includes one or more of changing the shape, duct cross section, volume or the like of the associated interface duct 502. For instance, the duct throttle 508 includes a throttle mechanism that facilitates one or more of increasing, decreasing or maintenance of the throttle profile to conversely change the duct profile of the interface duct 502. In an example, including a sensed characteristic such as a pressure greater than ambient flow of the agricultural product is indicated after closure of the control valve. The throttle controller 522, in one example, responsive to the sensed pressure increases the throttle profile to accordingly decrease the duct profile of the interface duct 502. The increased throttle profile accordingly enhances the pressure drop through the interface duct 502, decreases flow and accordingly facilitates the minimizing of errant agricultural product application through the sprayer tip 504. The modulation of the duct throttle 508, for instance, to increase the throttle profile and correspondingly decrease the duct profile of the interface duct 502 minimizes (e.g., decreases or eliminates) flow of the agricultural product from the sprayer tip 504 after closure of the associated control valves 506 (and optionally the injection control valve 512).

Conversely, with sensor input 524 indicating a pressure proximate to ambient pressure or a flow rate indicating no or minimal flow of the agricultural product after closure of the control valves 506, 512, the duct throttle 508 is, in one example, operated by the throttle controller 522 to accordingly maintain its profile or expand or dilate decreasing its profile and thereby increasing the duct profile of the interface duct 502. Increasing the duct profile facilitates the ready passage of agricultural product through the interface duct 502, for instance, while the control valves 506 (and optionally the injection control valve 512) are open in a next duty cycle. In one example, the duct throttle 508 is operated with the throttle controller 522 and one or more associated inputs, such as the sensor inputs 524, to conduct feedback control of the duct throttle 508 to expand, compress or maintain the throttle profile of the duct throttle 508 (herein sometimes referred to as dilating) to control one or more of flow rate, pressure (including pressure drop) through the interface duct 502 to minimize the errant application of agricultural product through sprayer tips 504 associated with the sprayer nozzle assemblies 500.

Referring again to FIG. 5A, other inputs are included with the duct throttle control system 520. One example of an additional or alternative input includes one or more of the sprayer tip profile input 526 or the alternative tip controller 528. The sprayer tip profile input includes one or more an orifice size, shape or the like that accordingly moderates the flow, spray pattern, droplet size or the like of the agricultural product through the sprayer tip 504. The sprayer tip profile input 526 is, in one example, used with the throttle controller 522 to modulate the duct throttle 508, for instance, with an associated throttle mechanism to provide a throttle profile and associated duct profile corresponding to the sprayer tip profile input, for instance, with sprayer tips 504 having various sizes, spray profiles, flow rate to pressure relationships or the like. With smaller sprayer tips 506 the throttle controller 522, in one example, provides associated smaller duct profiles, for instance, with an expanded duct throttle 508. Conversely with larger tip profiles configured to provide a higher flow rater, greater spray pattern or the like the duct throttle 508 is decreased or contracted with the throttle controller 522 to decrease the throttle profile and correspondingly increase the duct profile of the interface duct 502.

In still other examples, a tip controller, for instance, of a modulating sprayer tip, modulating tip orifice or the like (e.g., shown in FIG. 5B) is an input 528 for the throttle controller 522. The input from the tip controller 528, for instance, one or more of a control signal notification or the like indicating orifice profile for a specified flow rate, droplet size, spray pattern or the like is communicated from the tip controller 528 to the throttle controller 522 to facilitate control of the duct throttle 508 to a corresponding throttle profile and associated duct profile.

In another example, the control valve controller 530 providing a specified duty cycle for a corresponding flow rate or the like, is in communication as an input (530) with the throttle controller 522. In one example, the control valve controller 530 provides an indication to the throttle controller 522 of the opening and closing of one or more of the control valves 506, 512. By alerting the throttle controller 522 to the closing of the control valves 506, 512, one or more sensed values of characteristics measured with the sensors 514, 516 are input or used by the throttle controller 522 in a period corresponding to closure of the control valves 506, 512. Accordingly, one or more of pressure or flow rates measured with the sensors 514, 516 are accurately associated with the time period of operation for the control valves corresponding to closure. Accordingly, one or more of pressure (including pressure drop), flow rate or the like of the agricultural product through the interface duct 502 while the control valves 506, 512 are closed is logged or provided to the throttle controller 522 to provide corresponding actuation of the duct throttle 508 during the closed period of the control valves 506, 512. For instance, one or more of pressure drop or flow rate are accurately measured with the sensors 514, 516 while the control valves 506, 512 are in the closed position (when flow should be arrested) to accordingly ensure the duct throttle 508 is only expanded, contracted or maintained based on sensor measurements associated with the closed period of the duty cycle for each of the control valves 506, 512.

In another example, one or more inputs from the control valve controller 530 are used by the throttle controller 522 to actuate the duct throttle 508 in periods corresponding to one or more of closure of the control valves 506, 512 or opening of the control valves 506, 512. For instance, in one example, while the control valves are open (e.g., an open portion of a specified duty cycle) the duct throttle 508 is expanded to facilitate the passage of agricultural product through the interface duct 502 and through the sprayer tip 504 (for instance, without any or with less throttling). Accordingly, the duct throttle 508 is not working against the specified delivery and application of the agricultural product (e.g., while the control valve is actually open or 'on'). In another example, the duct throttle 508 is operated, for instance, to increase the throttle profile and decrease the duct profile during the closed portion of the specified duty cycle of one or more of the control valves 506, 512. Accordingly, the duct throttle 508 is, in one example, operated in an oscillating manner to expand and contract the duct throttle 508 and thereby decrease or increase the corresponding duct profile while the control valves 506 are in open and closed configurations respectively.

Figure 5B:
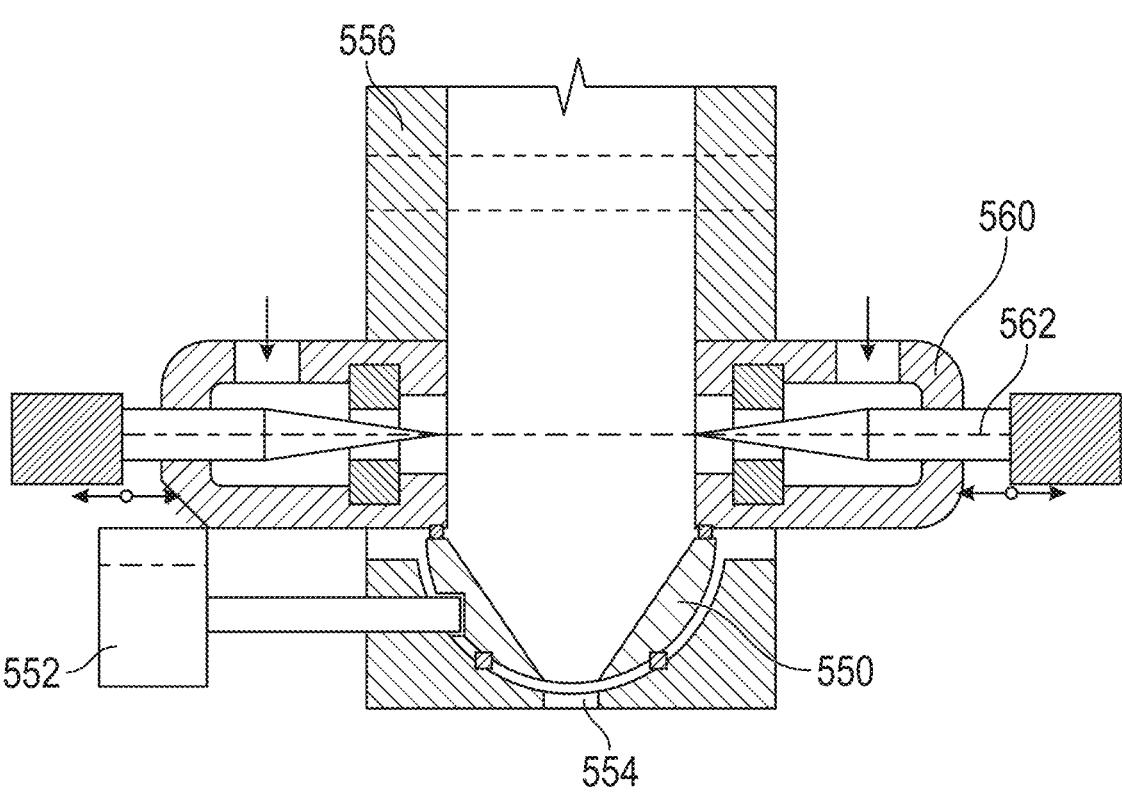
FIG. 5B is a cross sectional of a sprayer tip assembly having an example modulating tip orifice.

FIG. 5B is a cross section of one example of a modulating sprayer tip 551 configured to provide a variable tip orifice 554. The modulating sprayer tip 551 is in communication with an interface duct 556 or one or more of the interface ducts (e.g., 502, 308 or the like) previously discussed herein. The example modulating sprayer tip 551 includes at least one orifice plate 550 movably coupled with the remainder of the tip 551. In the example shown in FIG. 5B, the orifice plate 550 has a round contour and rotates when actuated relative to the remainder of the tip 551. In other examples, the orifice plate translates relative to the remainder of the tip 551, such as a housing. In still other examples, multiple orifice places 550 are provided in series to further refine the application of agricultural product through the tip orifice 554 (e.g., to provide a specified spray pattern, droplet size or the like across a range of flow rates or pressures).

The orifice plate 550 is optionally moved by the operator, for instance with a driver or other tool to position the plate 550 in a specified position having an associated tip profile for the tip orifice 554 (e.g., size, cross sectional area, spray pattern, droplet size, specified flow rates associated with specified pressures or the like). In other examples, the modulating sprayer tip 551 includes an orifice actuator 552 that operates the orifice plate 550. The orifice actuator 552 is in communication with a tip controller, such as the tip controller 528 that provides an example input to the throttle controller 522 in FIG. 5A. The tip controller 528 controls the orifice actuator 552 to move the orifice plate 550 to one or more specified positions with associated tip orifices 554. The tip controller 528 and the orifice actuator 552 accordingly control the position of the orifice plate 550 (and optionally multiple orifice plates) to provide corresponding tip profiles of the tip orifices 554 and associated application of the agricultural product with specified spray patterns, droplet sizes or the like.

As shown in FIG. 5A the orifice actuator 552 and the tip controller 528 are in communication with the throttle controller 522 (e.g., as part of the duct throttle control system 520) to provide the tip profile (also referred to as an orifice profile) to the throttle controller 522 to coordinate operation of the duct throttle 508. For instance, with relatively smaller tip profiles of the tip orifice 554 the duct throttle 508 is actuated with the throttle controller 508 to increase the throttle profile and correspondingly decrease the duct profile. Conversely, with relative larger tip profiles the duct throttle 508 is actuated by the throttle controller 508 to decrease the throttle profile and correspondingly increase the duct profile.

Referring again to FIG. 5B, the modulating sprayer tip 551 in another example includes a blending assembly 560. In the example shown the blending assembly 560 includes one or more choke element 562 that administer supplemental fluids to the agricultural product prior to delivery through the tip orifice 554. The introduction of fluids is conducted to maintain or achieve a specified droplet size of the agricultural product when applied from the sprayer tip 551. For instance, the one or more choke elements 562 are moved between fully restricted, fully open, and optional positions therebetween to control the introduction of supplemental fluid (e.g., air) to the agriculture product. The one or more choke elements 562 are operated in an automatic manner, for instance with the tip controller 528 in cooperation with one or more of the sensor inputs 524. For instance, as the flow rate of the agricultural product increases through the modulating spray tip 551 one or more of the, control valve sensors 514, 516 (e.g., flow meters, pressure sensors interpreted to determine flow or the like) monitors the changing flow, and the choke elements 562 are gradually moved outwardly and opened by the tip controller 528 (or choke controller) to permit increased flow of supplementing fluid to the agricultural product. The supplementing of the agricultural product by the blending assembly 560 is used, in one example, to realize a specified spray pattern, droplet size or the like. In this example, the supplementing fluid promotes agglomeration of the agricultural product (maintains or increases droplet size) and accordingly minimizes a decrease in droplet size otherwise realized with higher flow rates of the agricultural product. Conversely, the choke elements 562 are moved toward a closed configuration with relatively lower flow rates of the agricultural product to decrease promotion of agglomeration and thereby maintain a smaller specified droplet size.

FIGS. 6-8 are examples of sprayer nozzle assemblies 600, 700, 800 having associated duct throttles that are operable, for instance with the duct throttle control system 520 and throttle controller 522 shown in FIG. 5A. Each of the sprayer nozzle assemblies 600, 700, 800 includes associated duct throttles 602, 702, 802 configured to change the duct profile. In these examples, the duct throttles include associated throttle mechanisms 604, 704, 804 such as, but not limited to, pistons, bladders, collars, clamps or the like. The throttle mechanisms are configured to actuate the duct throttles and thereby change the duct profile, for instance, according to instructions from the throttle controller 522 of the duct throttle control system 502. As discussed herein, the throttle controller 522 optionally operates the throttle mechanisms 604, 704, 804 according to one or more inputs including, but not limited to, one or more of the sensor input 524 (e.g., pressure, flow or the like of the agricultural product), sprayer tip profile input 526 (input tip orifice characteristics), tip controller 528 (e.g., providing characteristics of a modulating tip orifice), control valve controller 530 (e.g., duty cycle, indication of valve closing or opening or the like). The inputs are used in a control algorithm, such as a feedback control loop, control the duct throttles and provide a corresponding duct profile that minimizes errant application of agricultural product, for instance while the associated control valves are closed.

Referring to FIG. 6, one example of a sprayer nozzle assembly 600 is shown including the duct throttle 602 and the associated throttle mechanism 604. As shown, the sprayer nozzle assembly 600 includes a duct housing 606 and the interface duct 502 extending through the duct housing 606. The interface duct 502 is surrounded by one or more wall surfaces 608 that are movable as part of the duct throttle 602 to modulate the duct profile of the interface duct 502 (e.g., increase, decrease, maintain or the like).

The duct throttle 602 shown in FIG. 6 expands and contracts the interface duct 502 through movement of the wall surfaces 608. The wall surfaces 608 are coupled with pistons 610. The pistons 610 are movable relative to the duct housing 606 and accordingly move the wall surfaces 608. As shown in FIG. 6 the pistons 610 are coupled with the throttle mechanisms 604, and the throttle mechanisms 604 (e.g., pneumatic cylinders, hydraulic cylinders, screw drives or the like) actuate the pistons 610 and the wall surfaces 608 to expand or contract the interface duct 502 and its duct profile.

FIG. 7 is a cross sectional view of another example sprayer nozzle assembly 700 having the duct throttle 702 with an associated throttle mechanism. The interface duct 502 extends between the control valve 506 and the sprayer tip 504, and in this example, the duct throttle 702 is provided at one or more locations around the interface duct 502.

The duct throttle 702 in this example includes a bladder, deformable diaphragm or the like provided within the duct housing 706. Additionally, the duct throttle 702 (the bladder) is also the throttle mechanism 704 in combination with a source of fluid for filling and evacuating the duct throttle 702. As shown, the duct throttle 702 extends along the interface duct 502 between the control valve 506 and the sprayer tip 504. In other examples, the duct throttle 702 includes one or more bladders or diaphragms positioned at locations along the interface duct 502. In still other examples, the duct throttle 702 is a single bladder or diaphragm provided along the interface duct 502 (e.g., centrally, proximate to the control valve or the sprayer tip 504, or the like).

In operation, the duct throttle 702 is in communication with a source of fluid including, but not limited to, hydraulic fluid, water, gas (e.g., pneumatic) or the like delivered with a pump and associated valves. The fluid is pressurized and delivered to the duct throttle 702 to modulate the duct throttle 702 and accordingly modulate the duct profile of the interface duct 502. For instance, fluid is pumped to the duct throttle 702 to expand or inflate the throttle, increasing the throttle profile and conversely decreasing the duct profile. In another example, fluid is evacuated form the duct throttle 702 to deflate the throttle, decrease the throttle profile and increase the duct profile. In a similar manner to the duct throttles discussed herein the duct throttle 702 and its associated source of fluid are operated in an automatic ongoing manner with the throttle controller 522. The throttle controller 522 actuates the duct throttle 702 based on one or more inputs including, but not limited to, the inputs shown in FIG. 5A with the duct throttle control system 520.

FIG. 8 is a top view of another example sprayer nozzle assembly 800 having the duct throttle 802 with an associated throttle mechanism 804. The interface duct 502 extends into and out of the page in FIG. 8, and the duct throttle 802 is coupled around the interface duct 502 between the control valve 506 and the sprayer tip 504. The duct throttle 802 is provided at one or more locations along the interface duct 502, for instance the throttle 802 shown in FIG. 8 extends along the interface duct 502 (into and out of the page) or two or more instances of the throttle 802 are coupled along the interface duct 502. The duct throttle 802 and the interface duct 502 are optionally housed within a duct housing 806 that protects one or more of the duct 502 and the throttle 802.

The duct throttle 802 in this example includes a collar, clamp, actuatable ring or the like coupled around the interface duct 502. For example, the duct throttle 802 is adhered, bonded or the like with a deformable diaphragm film or the like serving as the interface duct 502. The throttle mechanism 804 in this example includes a motor, drive or actuator like including, but not limited to, a screw drive, worm drive, linear actuator or the like configured to actuate the duct throttle 802. For instance, the throttle mechanism 804 modulates the duct throttle 802 by expanding, contracting or maintaining the duct throttle 802 and accordingly expanding, contracting or maintaining the interface duct 502. Various positions of the duct throttle 802 in expanded, contracted and intermediate configurations are shown with the solid line view and companion dashed line views provided in FIG. 8.

The example duct throttle 802 includes ridges, knurling, grooves, a tacky surface, surface having enhanced friction or the like that cooperate with the throttle mechanism 804 to permit movement of the duct throttle 802. In one example, the throttle mechanism 804 is a worm drive (e.g., a screw or worm gear) operatively coupled with the duct throttle 802 as a worm wheel. For instance, the worm drive engages with the ridges, knurling, grooves, surface or the like of the duct throttle 802 and is configured to actuate the throttle. Rotation of the throttle mechanism 804, for instance with an associated motor, expands or contracts the duct throttle 802 and accordingly expands or contracts the interface duct 502. The dashed lines shown in FIG. 8 correspond to expanded and contracted example configurations of the duct throttle 802 and the interface duct 502 coupled with the throttle 802.

In operation, the throttle mechanism 804 is in communication with a source of power including hydraulic fluid, electrical or the like. The duct throttle 802 including the associated throttle mechanism 804 are operated in an automatic ongoing manner with the throttle controller 522. The throttle controller 522 actuates the duct throttle 802 based on one or more inputs including, but not limited to, the inputs shown in FIG. 5A with the duct throttle control system 520. For instance, to increase a pressure drop between the control valve and the sprayer tip to minimize errant application of the agricultural fluid while the control valve is closed the throttle controller 522 monitors one or both of pressure or flow rate along the interface duct 502, detects that the monitored characteristic indicates continued flow while the valve is closed, and actuates the duct throttle 802 with the throttle mechanism to contract the throttle 802 (decrease the throttle profile) and accordingly decrease the duct profile of the interface duct 502. The decreased duct profile enhances the pressure drop, for instance proximate to valve closure, and minimizes errant application of the agricultural product after closure of the control valve. Conversely, if the throttle controller 522 detects the pressure drop (or flow rate) in the interface duct 502 caused with the duct throttle 802 is impermissibly constraining flow of the agricultural product with an elevated pressure drop (or minimal flow rate) the throttle controller 522 expands the duct throttle 802 with the throttle mechanism 804 to attenuate the pressure drop (or permit increased flow). In some examples, the throttle controller 522 actuates the duct throttle 802 to expand the throttle 802 (and the interface duct 502) with the control valve 'on' for agricultural product application and contracts the throttle 802 with the control valve 'off' to minimize errant application of the agricultural product. With control valves that are operated in a reciprocating manner, for instance pulse width modulation controlled valves, the duct throttles 802, 508, 602, 702 or the like are optionally operated in similar manner to accordingly expand and contract the interface duct 502 (and increase or decrease the duct profile) while the control valve is open or closed, respectively.

Figures 9A, 9B:
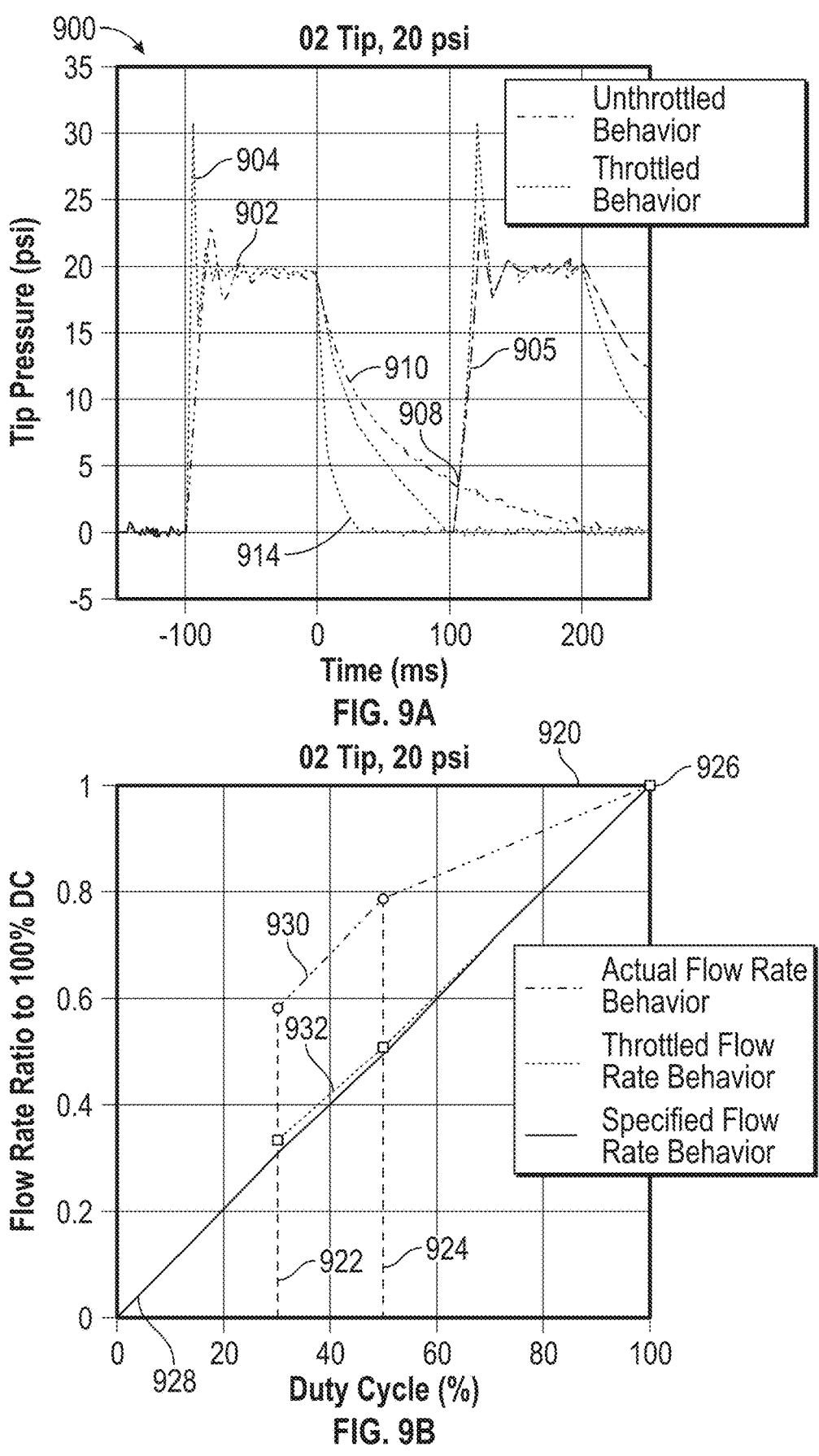
FIG. 9A is tip pressure and time graph including tip pressure measurements with and without a duct throttle.
FIG. 9B is a flow rate ratio and duty cycle graph including flow rate ratio plots for sprayer nozzle assemblies with and without a duct throttle.

FIGS. 9A and 9B are example plots illustrating errant application of agricultural product and minimization of errant application with the duct throttles, duct throttle control system 500 and throttle controller 520 described herein. Referring first to FIG. 9A and example tip pressure and time plot 900 is provided. Time, in units of milliseconds (ms), is provided along the x axis and tip pressure, in units of psi, is provided along the y axis. Two example duty cycles are shown with the plots. The first duty cycle begins at −100 ms and ends at 100 ms, with the 'on' or open portion of the first duty cycle for a control valve spanning from −100 ms to 0 ms. The second duty cycle begins with another 'on' portion at 100 ms and continues in a near identical manner to the first duty cycle.

The tip pressure and time plot 900 includes plotted initial and duct throttled behaviors for a sprayer nozzle assembly 300 (see FIGS. 3 and 4B). The initial behavior 902, an unthrottled version of the sprayer nozzle assembly 300 (also referred to a standard nozzle body), is shown with the dash and dotted stippling pattern. The duct throttled behavior 904 is shown with the dotted stippling pattern. As shown, and discussed further herein, the duct throttled behavior 904 has a rapid pressure drop proximate to the valve 306 closure (or 'off' position) at 0 ms indicating flow in the interface duct 308 is minimal proximate to the valve closure.

In contrast, the initial (unthrottled) behavior 902 shows an attenuated (gradual) pressure drop 910 after closure at 0 ms that indicates continued flow through the interface duct 308 and corresponding errant application of the agricultural product while the control valve 306 is closed. The pressure measurements trend toward zero psi after valve closure at 0 ms, but are significantly slower than the example duct throttled behavior 904 and the associated duct throttled pressure drop 914. Stated another way, with the control valve 306 closed the flow rate of the agricultural product through the spray tip 304 (see FIG. 4B) should stop, however with the unthrottled initial behavior 902 the agricultural product continues to flow even with the control valve closed 306. Further, the attenuated pressure drop 910 meets the 'on' portion of the proximate (next) portion 905 of the second duty cycle at the intersection 908 shown in FIG. 9A at approximately 100 ms. Accordingly, with the initial behavior 902 the sprayer nozzle assembly 300 continues to errantly apply the agricultural product across the entire 'off' portion of the first duty cycle. As discussed herein, the errant application of the agricultural product overapplies agricultural product relative to a flow rate associated with a specified duty cycle of the control valve 306. Additionally, the errant application wastes agricultural product that is not intended for application outside of the specified duty cycle.

Further still, the errant application may overapply the agricultural product in contravention of regulations and rules on the application of the agricultural product.

FIG. 9B further illustrates the potential errant overapplication of the agricultural product relative to a specified duty cycle with the actual flow rate relative to duty cycle plot 920. A specified flow rate behavior 928 is shown that plots a gradual ideal increase in flow rate (along the y axis) relative to corresponding increases in duty cycle (along the x axis). As shown, with the graduated increased in the specified duty cycle the corresponding specified flow rate also shows a graduated increase.

In contrast to the specified flow rate behavior 928 an actual flow rate (initial) behavior 930 is shown for an unthrottled sprayer nozzle assembly 300 (without a duct throttle or deactivated duct throttle). The actual (unthrottled) flow rate behavior 930 deviates from the specified flow rate behavior 928. For instance, two example duty cycles 922, 924 are shown with vertical lines in FIG. 9B corresponding to duty cycles of 30 and 50 percent, respectively. Along the plot of the specified flow rate behavior 928 the flow rate ratio for the duty cycle 922, 30 percent, is approximately 30 percent relative to a maximum (fully 'on') flow rate shown with the 100 percent duty cycle 926. The flow rate ratio for the duty cycle 924, 50 percent, is approximately 50 percent relative to the 100 percent duty cycle 926. In contrast, the flow rate ratio for the 30 percent duty cycle 922 is approximately 55 percent along the actual flow rate behavior 930 plot in comparison to the 30 percent flow rate ratio for the specified flow rate behavior 928, a variation of 25 percent. The flow rate ratio for the 50 percent duty cycle 924 is approximately 80 percent along the actual flow rate behavior 930 plot in comparison to the 50 percent flow rate ratio for the specified flow rate behavior 928, a variation of 30 percent. The variations between the specified flow rate behavior 928 and the actual flow rate behavior 930 correspond to errant application of the agricultural product beyond specified flow rates and associated duty cycles.

In one example, a duct throttle 402 (see FIGS. 4A, B) is installed within the interface duct 308 to decrease the duct profile of the duct. The decreased duct profile provided with the duct throttle 402 enhances the pressure drop at control valve 306 closure and provides the duct throttled pressure drop 914 shown in FIG. 9A indicating minimal flow after valve 306 closure at 0 ms. In the context of FIG. 9B, the throttled flow rate behavior 932 corresponds to the behavior of the control valve 306 having the duct throttle 402. As shown, the throttled flow rate behavior 932 closely corresponds to the specified flow rate behavior 928, and accordingly variation of the flow rate ratio along the throttled flow rate behavior 932 is minimal relative to the specified flow rate behavior. The correspondence between the behaviors 928 and 932 indicates minimal variation of the actual agricultural product flow rate relative to a specified flow rate of the agricultural product along with enhanced application resolution and minimized waste of agricultural product.

In another example, the throttle controller 522 actuates a duct throttle 508 (see FIG. 5A) associated with an interface duct 502 based on one or more inputs after valve 506 (or 512) closure. For instance, one or more of pressure, flow rate, tip (orifice) profile, control valve duty cycle or the like are inputs to the throttle controller 522 of a duct throttle control system 520. The duct throttle 508 is modulated (e.g., expanded, contracted, maintained or the like) based on the inputs and control provided with the throttle controller 522. For instance, at least during the closed portion of the control valve 506 duty cycle the throttle profile is increased (expanded) to correspondingly decrease the duct profile of the interface duct 502. Optionally, the proximate to the open portion of the duty cycle (e.g., proximate to opening of the control valve 506) the throttle profile is decreased (compressed) to correspondingly increase the duct profile of the interface duct 502.

The decreased duct profile provided with the duct throttle 508 enhances the pressure drop at the control valve 506 closure and provides the duct throttled pressure drop 914 shown in FIG. 9A indicating minimal flow after valve 506 closure at 0 ms. In the context of FIG. 9B, the throttled flow rate behavior 932 corresponds to the behavior of the control valve 506 having the duct throttle 508 (or the other example throttles discussed herein). As shown, the throttled flow rate behavior 932 closely corresponds to the specified flow rate behavior 928, and accordingly variation of the flow rate ratio along the throttled flow rate behavior 932 is minimal relative to the specified flow rate behavior. The correspondence between the behaviors 928 and 932 indicates minimal variation of the actual agricultural product flow rate relative to a specified flow rate of the agricultural product along with enhanced application resolution and minimized waste of agricultural product.

In still another example, the attenuation of the pressure drop or flow rate with the duct throttle 508 is controlled, for instance to provide an enhanced pressure drop and corresponding decrease of agricultural product flow rate relative to the attenuated pressure drop 910 of the initial (unthrottled) behavior 902 and greater than the duct throttled pressure drop 914 immediately proximate to valve 306 closure at 0 ms (e.g., a pressure drop between unthrottled and duct throttled behaviors 902, 904). As shown the pressure measurements of the initial unthrottled behavior 902 trend toward zero psi after valve closer (0 ms), but are significantly slower than the example duct throttled behavior 904 and the associated pressure drop 914. In one example, the throttle controller 522 modulates the duct throttle (expands, contracts, or maintains) based on the measured pressures or flow rates after closure.

For instance, the degree of modulation (expansion, contraction or the like) is increased or decreased (e.g., scaled) based on a specified attenuation, such as a desired pressure drop, pressure drop relative to time or the like to guide the pressure drop and associated flow rate of the agricultural product after closure of the control valve 506 toward the pressure drop 914 or an intervening drop (e.g., as shown with the example dashed line between the unthrottled and throttled behaviors 902, 904). The throttle controller 522 actuates the duct throttle in a graduated manner and scales actuation of the duct throttle and the corresponding duct profile decrease from the actuated throttle based on flow or pressure measurements after closure of the valve. For example, at measured flow rates or pressures that indicate a flow trend toward zero gallons per minute (gpm) proximate to 10 ms of valve closure throttling of the duct profile with the duct throttle is minimal (including no throttling).

At measured flow rates or pressures that indicate a flow rate trending toward zero gpm at times greater than 10 ms the duct throttle is enlarged relative to the previous circumstance to correspondingly provide a greater decrease of the duct profile to arrest flow of the agricultural product more rapidly (e.g., closer to 10 ms). One example of this behavior is shown in FIG. 9A with the pressure drop 914 achieved with an actuated duct throttle and the intervening pressure drop between 914 and the unthrottled initial behavior 902 that indicates graduated operation of the duct throttle with the controller 522. For instance, the duct profile is decreased more significantly for flow measured at 20 ms or later after valve closure while the duct profile is decreased less significantly (including no throttling) if flow is measured at 10 ms or less after valve closure. Additionally, in some examples the duct profile is decreased less significantly (and the throttle profile maintained larger) to minimize the effect during the 'on' portion of the duty cycle. An expanded duct throttle may affect performance while the valve is 'on', for instance by changing droplet size, spray pattern, application flow rate or the like outside of specifications. By moderating the duct throttle expansion one or more of droplet size, spray pattern or application flow rate are maintained within specifications while also guiding the pressure drop 910 in a manner approaching the steeper pressure drop 914.

In yet another example, at relatively high duty cycles the variation between flow rates (as shown in FIG. 9B) begins to decrease as the control valve 506 is 'on' or open a larger portion of the cycle. Accordingly, errant application of the agricultural product is minimized in the 'off' portion because the 'off' portion is relatively small portion of the overall cycle. In this circumstance, the throttle profile is optionally decreased and the duct profile conversely increased to minimize constriction of the interface duct 502 during the 'on' portion of the duty cycle when a specified flow rate and application are desired.

Optionally, with higher boom pressures (e.g., 40 psi relative to 20 psi or the like) or larger sprayer tips (rated for greater flow rates) the pressure drop 910 is steeper with the control valve 'off' and trends more toward the pressure drop 914. In these circumstances the duct throttle is actuated to a lesser extend (including no throttling) because the pressure drop 910 is sufficient, for instance based on the assessment of the throttle controller 522 in communication with the sensor input 524.

Figure 10:
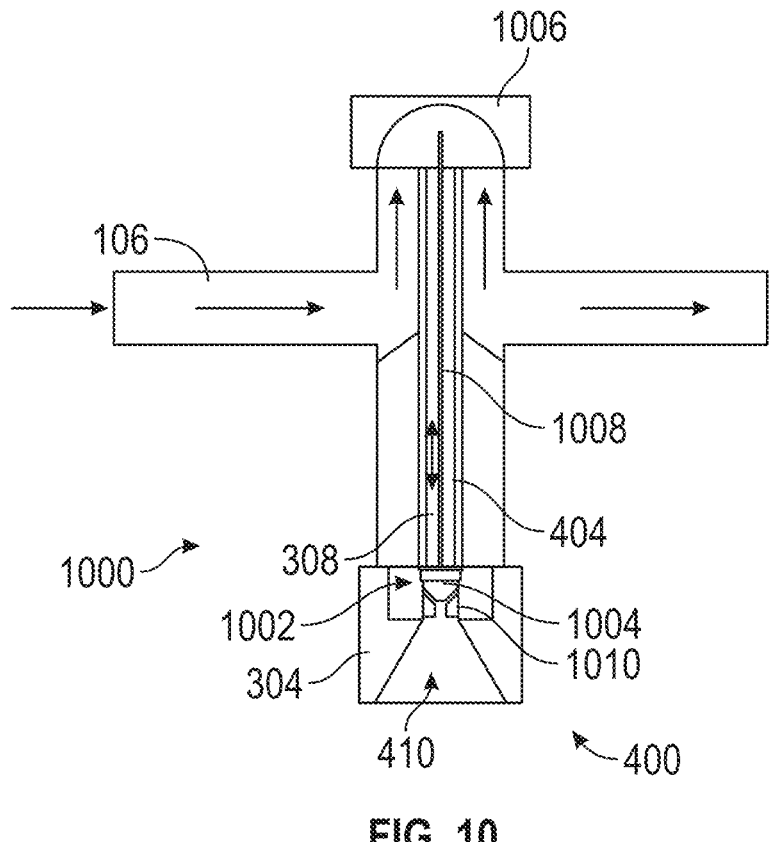
FIG. 10 is a schematic view of another sprayer nozzle assembly including an actuator and an example valve operator proximate a spray tip.

FIG. 10 is a schematic view of another example of a sprayer nozzle assembly 1000. In this example, the duct throttle includes a plug, fitting, plunger, cap or the like (herein referred to as duct throttle 1002) as another example duct throttle configured to minimize errant delivery of agricultural product from the assembly 1000, for instance after closure of a control valve.

As shown in FIG. 10, the sprayer nozzle assembly 1000 is in communication with a boom tube 106 that provides the agricultural product to the assembly 1000. The sprayer nozzle assembly includes a spray tip 304 or tip assembly 400 having a tip orifice 410 (e.g., with an associated tip profile or profiles if it is a modulating tip). In one example, the tip assembly 400 is a component of the sprayer nozzle assembly 300 that is coupled with the interface duct 308 that directs flow from the boom tube 106 to the spray tip 304. As previously discussed, a control valve is interposed between the spray tip 304 and the boom tube 106, and the control valve regulates flow of the agricultural product though the spray tip 304.

In one example, the duct throttles discussed herein throttle flow of the agricultural product from the control valve through the tip orifice 410 of the tip assembly 400 to minimize the errant application of the agricultural product outside of the specified flow rate and associated duty cycle implemented with the control valve. FIG. 10 includes another example duct throttle 1002 that minimizes errant application of the agricultural product through closure of the interface duct 308. The duct throttle 1002 includes a throttle operator 1004 proximate to the spray tip 304. For instance, in the example shown in FIG. 10, the throttle operator 1004 is configured for seating with (and unseating from) a throttle seat 1010 of the tip assembly 400. An operator shaft 1008 extends from the throttle operator 1002 toward a throttle actuator 1006. In the example shown in FIG. 10 the operator shaft 1008 extends through the interface duct 308 to the throttle actuator 1006. The throttle actuator 1006 includes, but is not limited to, a solenoid, stepper motor, pneumatic actuator, hydraulic actuator or the like configured to move the operator shaft 1008 and the throttle operator 1004 between closed and open positions.

Opening of the duct throttle 1002 opens the interface duct 308 and permits the passage of agricultural product to and through the tip orifice 410, for instance with opening of a control valve. Conversely closing of the duct throttle 1002, such as seating of the throttle operator 1004 with the throttle seat 1010, closes the interface duct 308 and isolates the interface duct from the tip orifice 410. Closure of the interface duct 308 with the duct throttle 1002 arrests the errant application of agricultural product from the interface duct 308 through the tip orifice 410 (e.g., reduces or eliminates application). In one example, the duct throttle 1002 is actuated in concert with a separate or distinct control valve (e.g., control valves 506, 512 in FIG. 5A). In operation, upon closure of the control valve (506 or 512) the duct throttle 1002 is moved with the throttle actuator 1006 to correspondingly move the operator shaft 1006 and the throttle operator 1004 to seat with the throttle seat 1010 and close the interface duct 308. As the control valve is opened (e.g., according to a specified duty cycle, associated flow rate or the like) the throttle actuator 1006 unseats the throttle operator 1004 from the throttle seat 1010 to open communication between the interface duct 308 and the tip orifice 410 and thereby permit application of the agricultural product.

In another example, the duct throttle 1002 is included as a component of the control valve of the sprayer nozzle assembly 1000. For instance, the duct throttle 1002 is consolidated with a control valve for the sprayer nozzle assembly 1000 to provide a specified flow rate (e.g., including a duty cycle corresponding to the flow rate) with the operable portion of the control valve (the throttle operator 1004) proximate to the spray tip 304. In this example, the control valve includes the throttle operator 1004 as the valve operator. With the throttle operator 1004 proximate to the spray tip 304 of the tip assembly 400 the interface duct 308 is isolated and opened relative to the tip orifice 410 based on the specified duty cycle (and associated flow rate) for the control valve. For instance, as the control valve including the throttle operator 1004 is opened and closed the interface duct 308 is correspondingly opened and closed as the operator 1004 unseats and seats from the throttle seat 1010. In such an example, the interface duct 308 is effectively shortened to the space between the spray tip 304 and the throttle operator 1004 (in this example the control valve) thereby minimizing the volume available to an interface duct, increasing pressure drop, and correspondingly decreasing errant application.

In still other examples, and as discussed herein, the interface duct 308 is coupled with a respective spray tip 304. The interface duct 308 is optionally shortened to decrease the duct profile, promote pressure drop, and thereby minimize errant application of the agricultural product. The spray tip 304 and the associated (shortened, narrowed, or the like) interface duct are installed to the control valve 1006 to position the control valve 1006 in close proximity to the spray tip (relative to the elongate duct 308 shown in FIG. 10) and thereby decrease the duct profile and the associated errant application of the agricultural product. In still other examples, the spray tip 304 and the control valve 1006 are provided as an assembly with an interface duct having a specified (decreased) duct profile including one or more of decreased cross sectional area, decreased length to position the valve in proximity to the tip, or the like.

VARIOUS NOTES AND ASPECTS

Aspect 1 can include subject matter such as a sprayer tip assembly comprising: a sprayer tip configured to spray an agricultural product, the sprayer tip includes: a tip orifice; and a duct seat configured to couple with an interface duct of a sprayer nozzle assembly; and a duct throttle extending from the duct seat, the duct throttle includes: a product passage in communication with the tip orifice; and a throttle sidewall configured for seating in the interface duct, wherein the throttle sidewall is configured to at least partially fill the interface duct.

Aspect 2 can include, or can optionally be combined with the subject matter of Aspect 1, to optionally include wherein the duct throttle is integral to the sprayer tip.

Aspect 3 can include, or can optionally be combined with the subject matter of one or any combination of Aspects 1 or 2 to optionally include wherein the tip orifice includes a tip orifice profile and a modulating orifice plate configured to change the tip orifice profile.

Aspect 4 can include, or can optionally be combined with the subject matter of one or any combination of Aspects 1-3 to optionally include the interface duct; wherein the interface duct includes an interface duct profile; and wherein the throttle sidewall includes a throttle profile, and the throttle profile fills the interface duct and decreases the interface duct profile.

Aspect 5 can include, or can optionally be combined with the subject matter of one or any combination of Aspects 1-4 to optionally include wherein the throttle profile of the throttle sidewall decreases the interface duct profile around 50 percent or more.

Aspect 6 can include, or can optionally be combined with the subject matter of Aspects 1-5 to optionally include wherein a duct throttle length of the duct throttle corresponds with an interface duct length of the interface duct.

Aspect 7 can include, or can optionally be combined with the subject matter of Aspects 1-6 to optionally include wherein the interface duct profile includes one or more of a volume of the interface duct, a cross sectional area of the interface duct, a diameter or radius of the interface duct, length of the interface duct, a dimension of a cross section of the interface duct or shape of a cross section of the interface duct.

Aspect 8 can include, or can optionally be combined with the subject matter of Aspects 1-7 to optionally include wherein the throttle sidewall includes a complementary profile to the interface duct.

Aspect 9 can include, or can optionally be combined with the subject matter of Aspects 1-8 to optionally include wherein the throttle sidewall is unbroken between the duct seat and a distal portion of the duct throttle.

Aspect 10 can include, or can optionally be combined with the subject matter of Aspects 1-9 to optionally include wherein the duct throttle includes a throttle insert having the throttle sidewall.

Aspect 11 can include, or can optionally be combined with the subject matter of Aspects 1-10 to optionally include wherein the throttle insert includes a kit of throttle inserts having different throttle sidewalls with respectively different throttle profiles.

Aspect 12 can include, or can optionally be combined with the subject matter of Aspects 1-11 to optionally include the sprayer nozzle assembly having the interface duct.

Aspect 13 can include, or can optionally be combined with the subject matter of Aspects 1-12 to optionally include a sprayer nozzle assembly comprising: a control valve configured to control a flow rate of agricultural product according to a duty cycle having valve open and valve closed positions; a sprayer tip having a tip orifice for spraying the agricultural product; a throttled interface duct interconnecting the control valve and the sprayer tip, the throttled interface duct includes: an interface duct profile; and wherein the interface duct profile is configured to decrease a flow characteristic of the agricultural product while the control valve is in the valve closed position.

Aspect 14 can include, or can optionally be combined with the subject matter of Aspects 1-13 to optionally include wherein the flow characteristic includes one or more of a pressure or flow rate of the agricultural product within the interface duct; and wherein the interface duct profile is configured to arrest the flow rate of the agricultural product with the control valve in the valve closed position.

Aspect 15 can include, or can optionally be combined with the subject matter of Aspects 1-14 to optionally include wherein arresting the flow rate of the agricultural product includes a flow rate of zero or a pressure of ambient pressure within the interface duct.

Aspect 16 can include, or can optionally be combined with the subject matter of Aspects 1-15 to optionally include wherein the sprayer tip includes a tip orifice profile for the tip orifice, and the tip orifice profile corresponds to specified flow rates through the tip orifice with associated specified product pressures with the control valve in the valve open position.

Aspect 17 can include, or can optionally be combined with the subject matter of Aspects 1-16 to optionally include wherein the interface duct profile of the interface duct is based on: the tip orifice profile; and decreasing the flow characteristic of the agricultural product while the control valve is in the valve closed position.

Aspect 18 can include, or can optionally be combined with the subject matter of Aspects 1-17 to optionally include wherein the throttled interface duct includes a throttle insert, and the throttle insert provides the interface duct profile.

Aspect 19 can include, or can optionally be combined with the subject matter of Aspects 1-18 to optionally include wherein the throttled interface duct includes a throttle mechanism, and the throttle mechanism is operable to change the interface duct profile.

Aspect 20 can include, or can optionally be combined with the subject matter of Aspects 1-19 to optionally include a sprayer nozzle assembly comprising: a control valve configured for interconnection with a source of fluid agricultural product, the control valve is configured to control a flow rate of the fluid agricultural product; a sprayer tip having a tip orifice, the sprayer tip configured to spray the fluid agricultural product; an interface duct interconnecting the control valve and the sprayer tip, the interface duct having an interface duct profile; and a duct throttle associated with the interface duct, the duct throttle includes: a throttle mechanism coupled along the interface duct, the throttle mechanism is operable to change the interface duct profile; and wherein the throttle mechanism includes at least first and second throttle configurations, in the first throttle configuration the interface duct profile is a first interface duct profile, and in the second throttle configuration the throttle mechanism decreases the interface duct profile to a second interface duct profile less than the first interface duct profile.

Aspect 21 can include, or can optionally be combined with the subject matter of Aspects 1-20 to optionally include wherein the throttle mechanism surrounds the interface duct.

Aspect 22 can include, or can optionally be combined with the subject matter of Aspects 1-21 to optionally include wherein the throttle mechanism is a component of the interface duct.

Aspect 23 can include, or can optionally be combined with the subject matter of Aspects 1-22 to optionally include wherein the throttle mechanism includes a bladder coupled along the interface duct.

Aspect 24 can include, or can optionally be combined with the subject matter of Aspects 1-23 to optionally include wherein the throttle mechanism includes a collar coupled along the interface duct and a collar drive coupled with the collar.

Aspect 25 can include, or can optionally be combined with the subject matter of Aspects 1-24 to optionally include wherein the throttle mechanism includes a piston coupled with the interface duct and a piston drive coupled with the piston.

Aspect 26 can include, or can optionally be combined with the subject matter of Aspects 1-25 to optionally include a duct throttle controller, the duct throttle controller configured to actuate the throttle mechanism between at least the first and second throttle configurations.

Aspect 27 can include, or can optionally be combined with the subject matter of Aspects 1-26 to optionally include wherein the duct throttle controller is configured to actuate the throttle mechanism between the first and second throttle configurations and intermediate configurations therebetween.

Aspect 28 can include, or can optionally be combined with the subject matter of Aspects 1-27 to optionally include a pressure sensor proximate to the interface duct; and the throttle controller is configured to actuate the throttle mechanism according to pressure measurements: with a first pressure measurement the throttle mechanism is in the first throttle configuration having the first interface duct profile; and with a second pressure measurement greater than the first pressure measurement the throttle controller actuates the throttle mechanism to the second throttle configuration having the second interface duct profile.

Aspect 29 can include, or can optionally be combined with the subject matter of Aspects 1-28 to optionally include wherein the tip orifice includes a tip orifice profile and a modulating orifice plate configured to change the tip orifice profile.

Aspect 30 can include, or can optionally be combined with the subject matter of Aspects 1-29 to optionally include wherein the tip orifice profile includes at least first and second tip orifices profiles and the first tip orifice profile is greater than the second tip orifice profile; and wherein the throttle controller is configured to actuate the throttle mechanism according to the tip orifice profile: in the first tip orifice profile the throttle controller actuates the throttle mechanism to the first throttle configuration having the first interface duct profile; and in the second tip orifice profile the throttle controller actuates the throttle mechanism to the second throttle configuration having the second interface duct profile.

Aspect 31 can include, or can optionally be combined with the subject matter of Aspects 1-30 to optionally include wherein the interface duct profile includes one or more of a volume of the interface duct, a cross sectional area of the interface duct, a diameter or radius of the interface duct, a dimension of a cross section of the interface duct or shape of a cross section of the interface duct, or a flow rate through the interface duct at a specified pressure of the agricultural product.

Aspect 32 can include, or can optionally be combined with the subject matter of Aspects 1-31 to optionally include a method for enhancing application of an agricultural product comprising: monitoring one or more of a valve closing or a valve opening following the valve opening of a control valve; monitoring a flow characteristic of the agricultural product in an interface duct between the control valve and a sprayer tip; controlling an interface duct profile to decrease the flow characteristic of the agricultural product between valve closing and valve opening, wherein controlling includes one or more of: decreasing the interface duct profile to decrease the flow characteristic proximate to valve closure; and increasing the interface duct profile to decrease the flow characteristic proximate to valve opening.

Aspect 33 can include, or can optionally be combined with the subject matter of Aspects 1-32 to optionally include wherein monitoring one or more of valve opening or valve closing includes monitoring a duty cycle of the control valve.

Aspect 34 can include, or can optionally be combined with the subject matter of Aspects 1-33 to optionally include wherein monitoring the flow characteristic of the agricultural product including monitoring one or more of flow rate of the agricultural or pressure representing flow of the agricultural product in the interface duct.

Aspect 35 can include, or can optionally be combined with the subject matter of Aspects 1-34 to optionally include wherein controlling the interface duct profile includes automatically controlling the interface duct profile and graduating the interface duct profile according to the monitored flow characteristic.

Aspect 36 can include, or can optionally be combined with the subject matter of Aspects 1-35 to optionally include wherein controlling the interface duct profile to decrease the flow characteristic includes decreasing a flow rate of the agricultural product between valve closing and valve opening.

Aspect 37 can include, or can optionally be combined with the subject matter of Aspects 1-36 to optionally include wherein controlling the interface duct profile to decrease the flow characteristic includes decreasing a pressure in the interface duct between valve closing and valve opening.

Aspect 38 can include, or can optionally be combined with the subject matter of Aspects 1-37 to optionally include wherein controlling the interface duct profile to decrease the flow characteristic includes increasing a pressure drop of the agricultural product between valve closing and valve opening.

Aspect 39 can include, or can optionally be combined with the subject matter of Aspects 1-38 to optionally include monitoring a tip orifice profile of the sprayer tip; and wherein controlling the interface duct profile to decrease the flow characteristic includes controlling the interface duct profile based on the tip orifice profile.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A sprayer tip assembly comprising:
an interface duct; and
a sprayer tip configured to spray an agricultural product, the sprayer tip includes:
a tip orifice in communication with the interface duct; and
a duct seat coupled with the interface duct;
a duct throttle extending from the duct seat, the duct throttle includes:
a product passage in communication with the tip orifice; and
a throttle sidewall configured for seating in the interface duct, wherein the throttle sidewall is configured to at least partially fill the interface duct, and the throttle sidewall includes a constant throttle profile from the duct seat to an end of the duct throttle.

2. The sprayer tip assembly of claim 1, wherein the duct throttle is integral to the sprayer tip.

3. The sprayer tip assembly of claim 1, wherein the tip orifice includes a tip orifice profile and a modulating orifice plate configured to change the tip orifice profile.

4. The sprayer tip assembly of claim 1,
wherein the interface duct includes an interface duct profile; and
wherein the throttle sidewall includes a throttle profile, and the throttle profile fills the interface duct and decreases the interface duct profile.

5. The sprayer tip assembly of claim 4, wherein the throttle profile of the throttle sidewall decreases the interface duct profile around 50 percent or more.

6. The sprayer tip assembly of claim 4, wherein a duct throttle length of the duct throttle corresponds with an interface duct length of the interface duct.

7. The sprayer tip assembly of claim 4, wherein the interface duct profile includes one or more of a volume of the interface duct, a cross sectional area of the interface duct, a diameter or radius of the interface duct, length of the interface duct, a dimension of a cross section of the interface duct or shape of a cross section of the interface duct.

8. The sprayer tip assembly of claim 1, wherein the throttle sidewall includes a complementary profile to the interface duct.

9. The sprayer tip assembly of claim 1, wherein the throttle sidewall is unbroken between the duct seat and a distal portion of the duct throttle.

10. The sprayer tip assembly of claim 1, wherein the duct throttle includes a throttle insert having the throttle sidewall.

11. The sprayer tip assembly of claim 10 comprising a kit of supplemental throttle inserts, the supplemental throttle inserts having different throttle sidewalls with respectively different throttle profiles relative to the throttle insert.

12. A sprayer nozzle assembly comprising the sprayer tip assembly of claim 1.

13. The sprayer tip assembly of claim 1, wherein the throttle sidewall continuously extends along the interface duct from the duct seat to the end of the duct throttle.

14. The sprayer tip assembly of claim 1, wherein the product passage has a constant profile from the duct seat to the end of the duct throttle according to the throttle sidewall.

\* \* \* \* \*